(12) United States Patent
Becher

(10) Patent No.: US 11,608,605 B1
(45) Date of Patent: Mar. 21, 2023

(54) OFFSHORE OCEAN RENEWABLE ENERGY HYDRO-TURBINE UNIT

(71) Applicant: Yona Becher, Budd Lake, NJ (US)

(72) Inventor: Yona Becher, Budd Lake, NJ (US)

( * ) Notice: Subject to any disclaimer, the term of this patent is extended or adjusted under 35 U.S.C. 154(b) by 20 days.

(21) Appl. No.: 17/803,335

(22) Filed: May 16, 2022

(51) Int. Cl.
| | |
|---|---|
| E02B 9/08 | (2006.01) |
| E02B 17/02 | (2006.01) |
| F03B 13/22 | (2006.01) |
| F03B 13/26 | (2006.01) |
| E02B 17/00 | (2006.01) |

(52) U.S. Cl.
CPC ............... *E02B 9/08* (2013.01); *E02B 17/02* (2013.01); *F03B 13/22* (2013.01); *F03B 13/264* (2013.01); *E02B 2017/0082* (2013.01); *F05B 2240/95* (2013.01)

(58) Field of Classification Search
CPC .... E02B 9/08; E02B 17/02; E02B 2017/0056; E02B 2017/006; E02B 2017/0073; E02B 2017/0082; F03B 13/14; F03B 13/26; F03B 13/264
USPC .......................................................... 405/76
See application file for complete search history.

(56) References Cited

U.S. PATENT DOCUMENTS

| | | | | |
|---|---|---|---|---|
| 6,568,878 B2* | 5/2003 | Woodall | ..................... | E02B 9/08 405/25 |
| 7,470,086 B2* | 12/2008 | Jennings | .................. | F03B 13/10 405/75 |
| 8,690,477 B2* | 4/2014 | Dempster | ............. | F03B 17/063 405/75 |
| 11,072,401 B2* | 7/2021 | Becher | ................ | E02B 17/0004 |
| 2004/0160060 A1* | 8/2004 | Montgomery | .......... | F03B 13/26 290/11 |
| 2012/0263537 A1* | 10/2012 | Thornton | .............. | F03B 13/142 405/76 |
| 2013/0243527 A1* | 9/2013 | Ayre | ..................... | F03B 17/061 405/76 |
| 2021/0039757 A1* | 2/2021 | Becher | ................... | A01K 61/60 |

FOREIGN PATENT DOCUMENTS

| | | | | | |
|---|---|---|---|---|---|
| AU | 2014351065 A1 | * | 6/2016 | ........... | B63B 35/003 |
| CN | 107725265 A | * | 2/2018 | ......... | E02B 17/0017 |
| DE | 202011108819 | * | 3/2012 | | |
| FR | 2723975 A1 | * | 3/1996 | ......... | E02B 17/0017 |

* cited by examiner

Primary Examiner — Frederick L Lagman

(57) ABSTRACT

Hydro Turbine unit producing 880 MW-h energy daily in offshore oceans creating average high-pressure compressed air transferable energy stored in air tanks and using generators to transform into local electrical energy. The harvesting of renewable offshore water energy of ocean wave, tidal and stream energy, converting it to accumulated water head potential energy in a large isolated water trapping pool structurally supported laterally by six tall towers extended to ocean maximum depth of 100 meter deep with arrow shape plungers pneumatic reciprocating hammering into seabed in slanted angle relative to seabed. The energized ocean water enters the trap pool through thousands of one-way check valves in the trap pool floor and surrounding walls. Large flow openings into 6 Hydro turbine manifolds direct swirling water through radial guiding vanes and conical converging top vertically downward through 8 turbine blades applying torque to turbine outlet shaft and flowing down to ocean level.

1 Claim, 36 Drawing Sheets

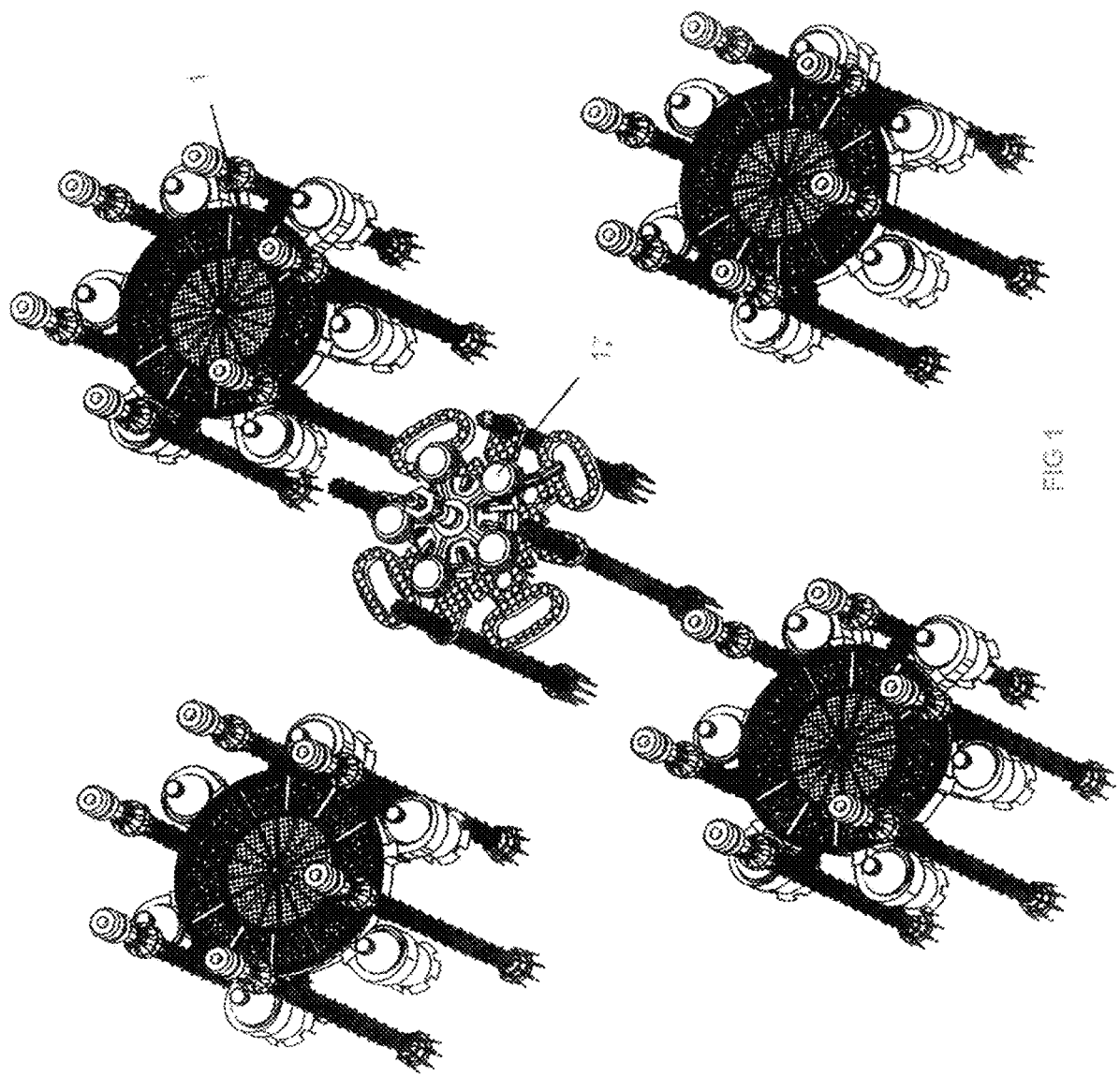

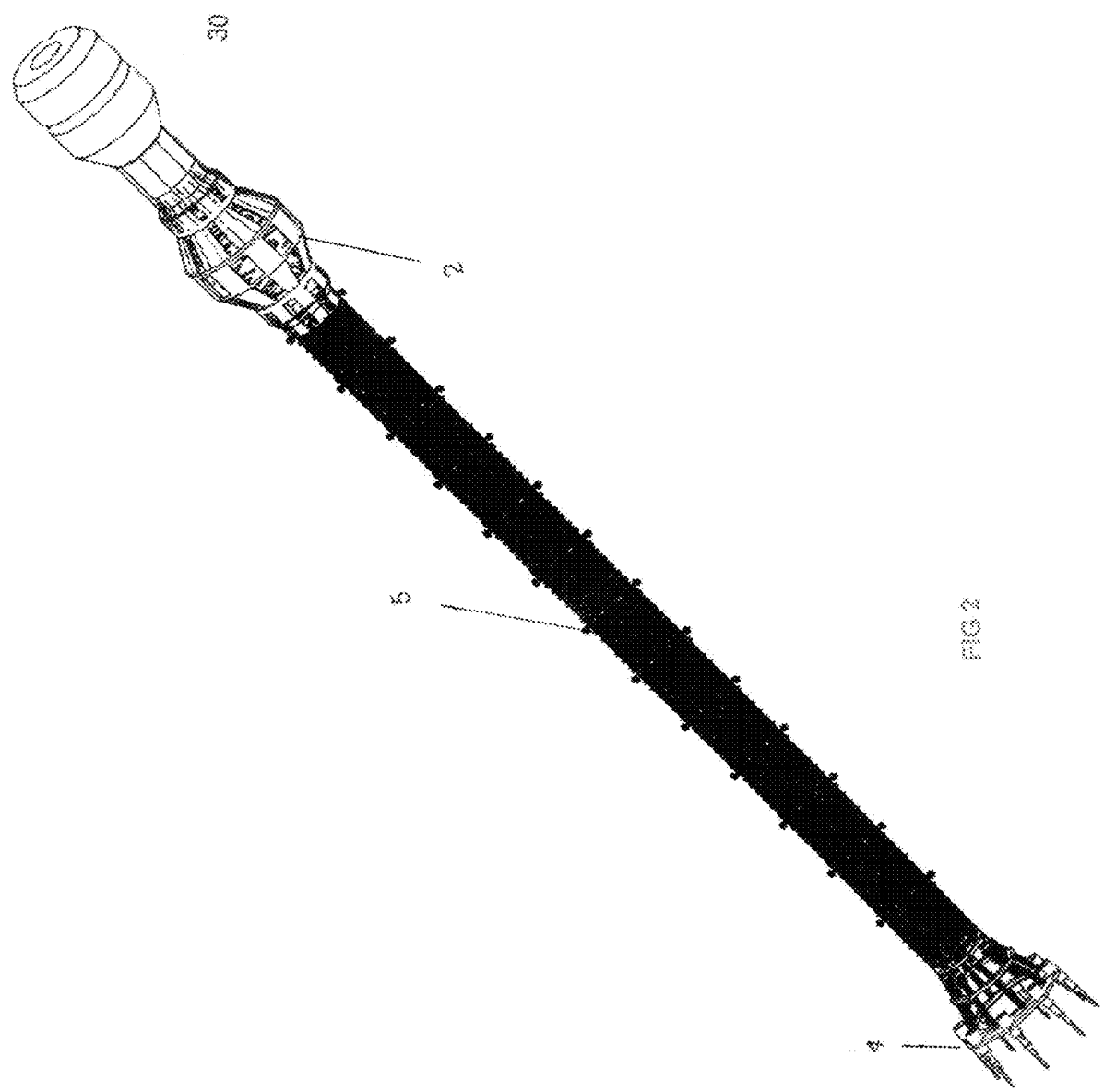

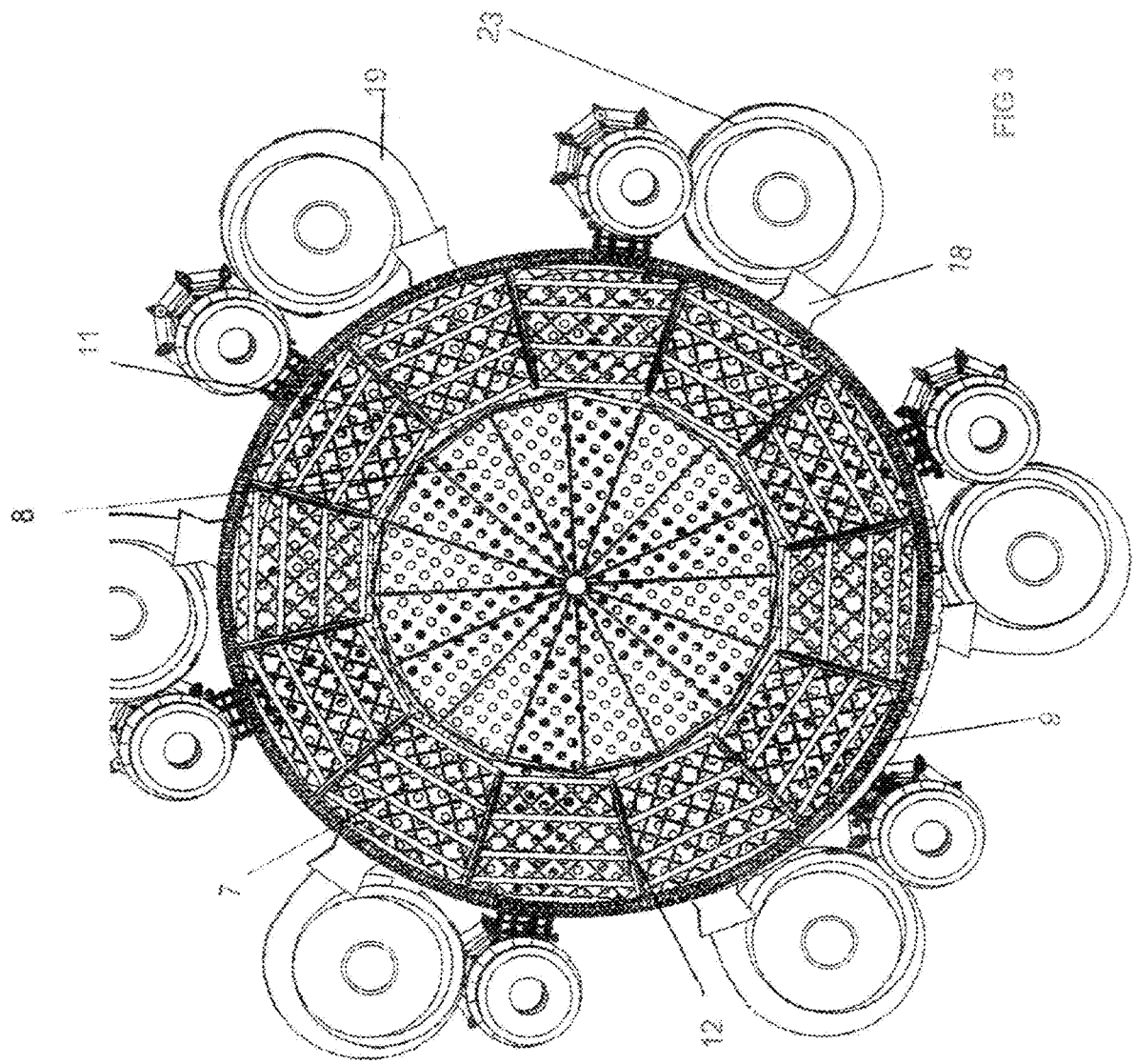

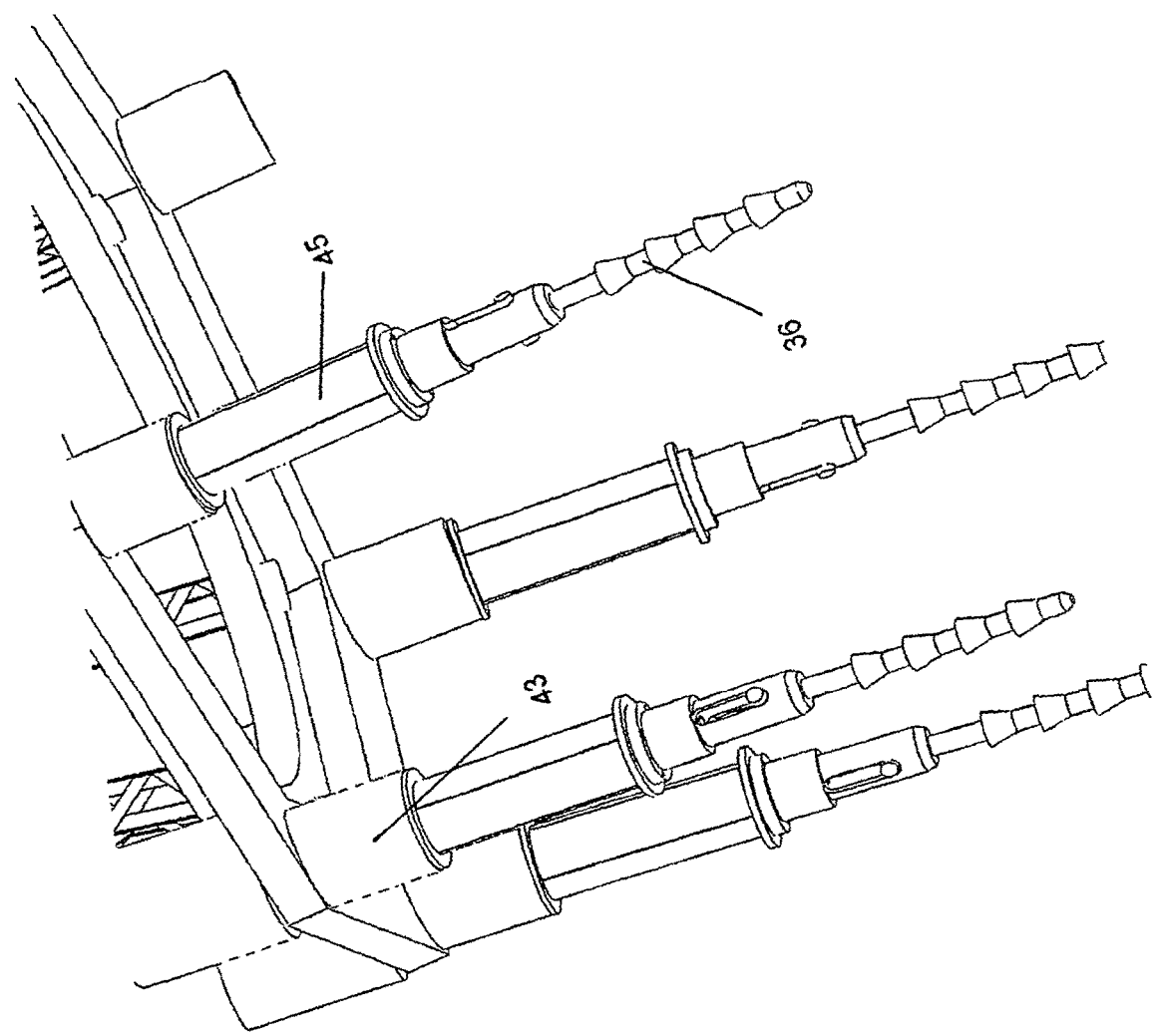

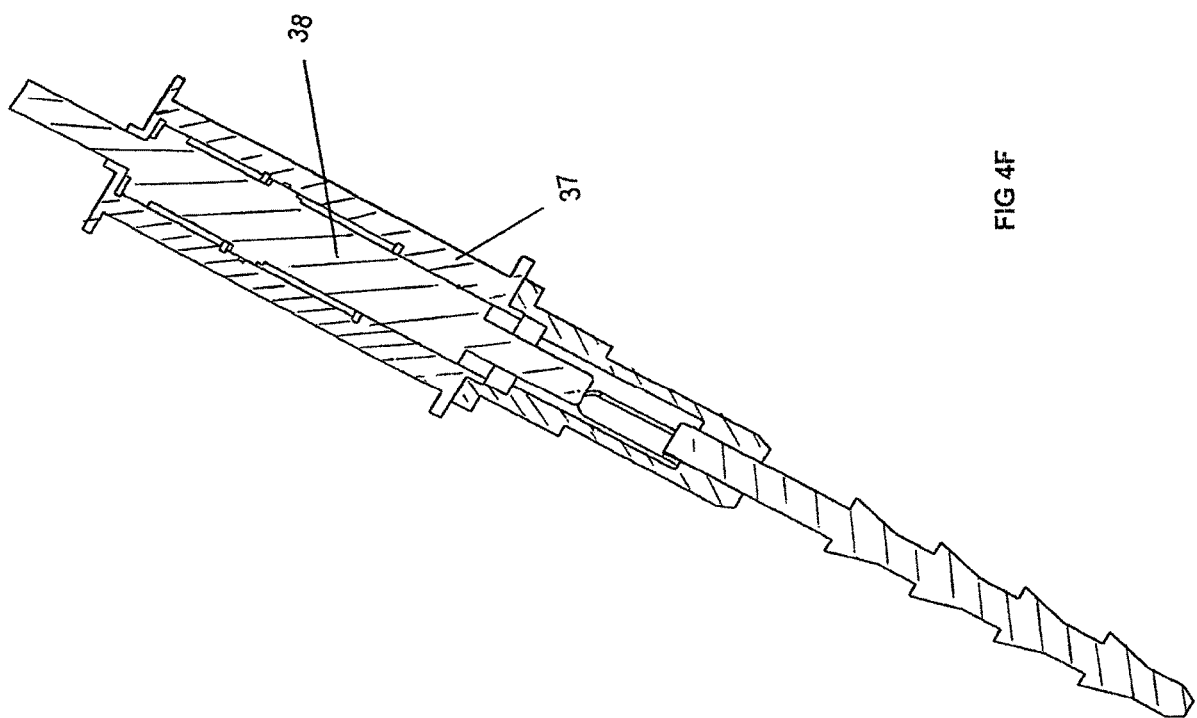

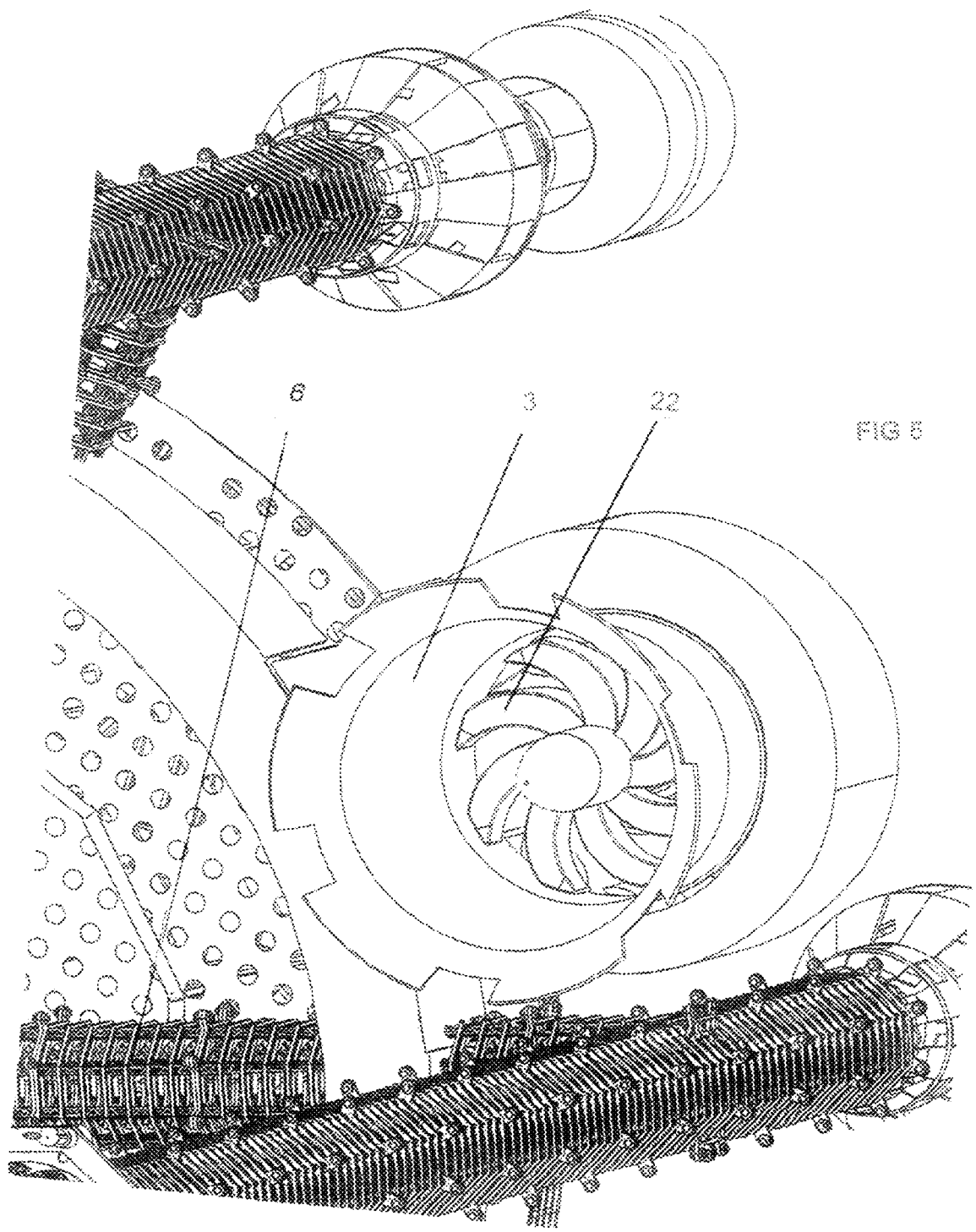

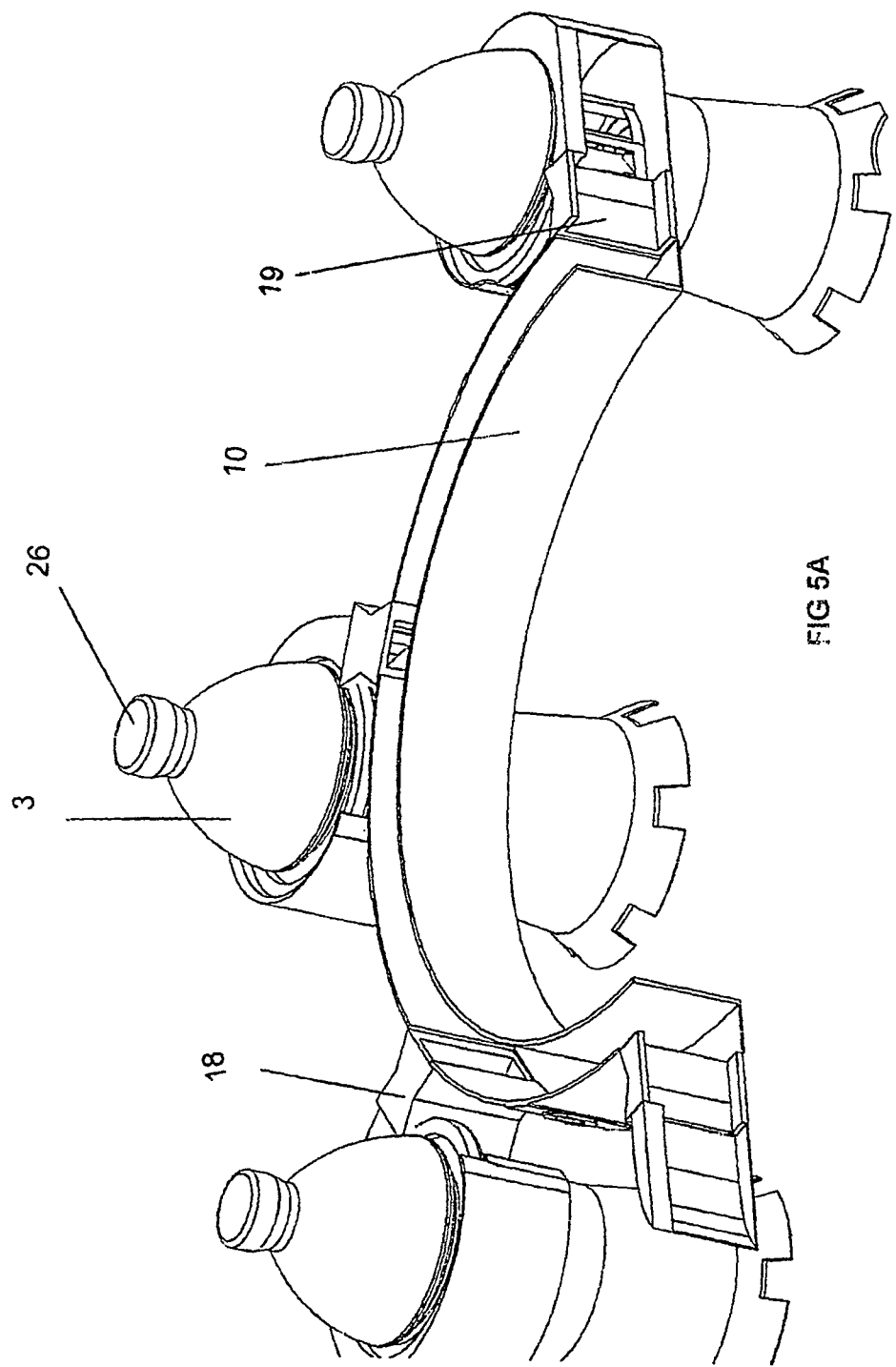

OFFSHORE OCEAN RENEWABLE ENERGY HYDRO-TURBINE UNIT

BACKGROUND OF THE INVENTION

The invention relates to large-scale production of average 880 MW-h per day of clean renewable energy in the offshore oceans around the world including electrical and mechanical compressed air energy offshore, taking advantage of the unlimited resources of the oceans around the world which consists more than 70 percent of the planet area. With major economic and environmental problems on land due to global warming affected weather, the global war on CO2 and on fusil energy of oil, gas and coal combined with political hostility on planet Earth, the ocean could be the new source of renewable clean energy as well as food for people and livestock all over the world. The invention related to producing renewable energy at low cost and with a very low investment cost per energy unit from wave, tidal and stream ocean water energy at offshore locations with up to 100 meters ocean floor depth using a towable mobile platform. The platform is built in a short time with relatively low investment of a few million dollars and it could be ready to produce hydro-turbine energy within a few months of budgeting with low maintenance and continuous working around the clock for years using ocean water. The harvesting of renewable offshore energy of ocean wave, tidal and stream energy, converting it to accumulated water head potential energy in a large isolated water trapping pool structurally supported laterally by six tall towers that extends to ocean floor up to 100 meter deep with multiple arrow plungers that are pneumatically hammered into sea bed to the ocean seabed in slanted angle relative to seabed plane. The pool water bottom outlets are connected to the inlet manifold of 6 high flow hydro turbines with their outlet port connected with divergence pipe into the surrounding ocean. Each hydro turbines' rotation shaft is coupled with an air compressor inlet shaft that compresses high pressure air into high pressure compressed air tanks where the energy is stored and is transferable to the land by naval means. Other hydro turbine shafts are coupled with electrical generator shafts and the electrical energy is stored in large capacity batteries that are transferable to the coast. converted to stored and transferrable compressed air pneumatic energy stored in air tanks located on decks of platforms. Energy is converted to electrical energy by using a generator input shaft-coupled to the turbine output shaft.

The objective of the invention is further related to harvesting hydropower from ocean high powerful wind flow over ocean water surfaces, The powerful wind creates water and high waves water head and water pressure applied to the walls of the trap pool. The high wave water is captured into the hydro turbine unit trap pool though multiple inlet holes through holes through the wall and the floor surrounding the pool each hole is equipped with one way ball type check valve which keeps the water in the trap pool but which is structurally secured to towers that are extended to oceans floor with lateral support and with hammered plungers into seabed.

The objective of the invention is further related to improve anchoring means and anchoring performance used for connecting floating objects including platforms, boats, ships and towers to the ocean floor seabed at depth up to 100 meters, using truss strengthened towers with pressurized air energy from air tanks located on floating platform to hammer pneumatic piston with plunger ends into the seabed in three dimensional directions. The new pneumatically hammered plungers into seabed replaces the anchor that used its own weight to sink into ocean seabed for thousands of years. In addition the objective of the invention is to capture powerful wind energy over ocean surfaces.

The following describe the scientific basis for converting ocean renewable energy to electrical and pressurized air power.

In fluid dynamics, Bernoulli's principle states that an increase in the speed of a fluid occurs simultaneously with a decrease in pressure or a decrease in the fluid's potential energy. Energy is generated from a hydro turbine.

Power is the rate of producing energy. Power is measured in Watts (N) or kilowatts (kW). Energy is what is used to do work and is measured in kilowatt-hours (kWh) or megawatt-hours (MWh). The maximum hydropower power output is entirely dependent on how much head and flow is available at the site. Therefore, a large utility-scale hydro system could easily produce hundreds of Megawatts (MW). To put this in context, a 1 kW hydropower system could satisfy the annual electrical energy needs of one average home.

The low head site would need a physically large Kaplan turbine inside a turbine house the size of a large garage because it would have to be physically large to discharge such a large volume of water with a relatively low pressure (head) across it.

The following is a description of the sources of renewable energy available in the oceans of the world from wind and waves, tidal and screams.

In the Northern Hemisphere, warm air around the equator rises and flows north toward the pole. As the wind moves away from the equator, the Coriolis effect deflects it toward the right. It cools and descends near 30 degrees North latitude. The descending wind blows from the northeast to the southwest, back toward the equator. A similar wind pattern occurs in the Southern Hemisphere; these winds blow from the southeast toward the northwest and descend near 30 degrees South latitude. The wind pushes water to higher ocean water levels which means hydro energy to be captured. Harvesting Hydro-energy from tidal ocean water level variations which cause increase in water level subjected to gravitational forces of the moon and the sun and in addition Coriolis lateral forces related to planet rotation. The result of Earth's rotation on weather patterns and ocean currents.

The Coriolis effect makes storms swirl clockwise in the Southern hemisphere and counterclockwise in the Northern Hemisphere Furthermore, harvesting hydro energy from ocean thermal water streams due to the rise and fall of sea levels. In addition, the objective of the patent is to harvest ocean current energy as continuous, directed movement of sea water generated by a number of forces acting upon the water, including wind, the Coriolis effect, breaking waves, cabbeling, and temperature and salinity differences.

The ocean currents depend on depth contours of the ocean floor, shoreline configurations that influence a current's direction and strength. Ocean currents are primarily horizontal water movements that apply hydrostatic pressure on the trap pool walls, flowing through wall and floor inlet check valves into the trap pool. High waves can be captured and accumulated in the trap pool when energized ocean current water pressure is applied to walls and floor of the trap pool and flowing through check valves into it.

Ocean surface currents are patterns of water energized movement that influence climate zones and weather patterns around the world while they are primarily driven by winds and by seawater density. Other factors including the shape and configuration of the ocean basin they flow through influence hydrostatic pressure on the trap pool walls and floor inlet check valves.

Ocean dynamics define and describe the motion of water within the oceans and their enormous captured energy that can be used to create a huge amount of low cost clean renewable energy for people living in American cities and beyond.

Ocean temperature and motion fields can be separated into three distinct layers: mixed surface layer, upper ocean, and deep ocean. Ocean currents are measured in Sverdrup, where 1 Sverdrup is equivalent to a volume flow rate of 1,000,000 m$^3$ per second. High stream flow rate means huge amounts of energy to operate hydro-turbines when the energy of the stream is converted to captured water head and water potential gravitational energy in the trap pools.

Surface currents, which make up only 8% of all water in the ocean, are generally restricted to the upper 400 meter depth of ocean water, and are separated from lower regions by varying temperatures and salinity which affect the density of the water. Surface oceanic currents are driven by wind currents, the large-scale prevailing winds drive major persistent ocean currents, and seasonal or occasional winds drive currents of similar persistence to the winds that drive them. The Coriolis effect plays a major role in their current development. The Ekman spiral velocity distribution results in the currents flowing at an angle to the driving winds, and they develop typical clockwise spirals in the northern hemisphere and counter-clockwise rotation in the southern hemisphere.

Tidal currents are an important source of high energy, creating water head potential energy in the trap pool with water rising, applying hydrostatic pressure upwards underneath the trap pool floor and flowing through check valves into the trap pool.

Tidal currents are the only type of current affected by the interactions of the Earth, sun, and moon. The moon's force is much greater than that of the sun because it is 389 times closer to the Earth than the sun is. Tidal currents are affected by the different phases of the moon. When the moon is at full or new phases, tidal current velocities are strong and are called "spring currents." When the moon is in the first or third quarter phases, tidal current velocities are weak and are called "neap currents."

Major surface currents of the world's oceans are a great source of ocean energy to be harvested with hydro-turbine renewable energy units. Subsurface currents also move vast amounts of water, but they are not known yet in such detail.

Thermohaline circulation begins in the Earth's polar regions. When ocean water in these areas gets very cold the surrounding seawater gets saltier, increases in density and sinks. Surface water is pulled in to replace the sinking water, which in turn eventually becomes cold and salty enough to sink. This initiates the deep-ocean currents driving the global conveyor belt. It transports and mixes the water of the oceans. In the process it transports heat, which influences regional climate patterns. The density of seawater is determined by the temperature and salinity of a volume of seawater at a particular location based on ocean floor depth. The difference in density between one location and another drives the thermohaline circulation. In fluid dynamics, Bernoulli's principle states that an increase in the speed of a fluid occurs simultaneously with a decrease in pressure or a decrease in the fluid's potential energy. Energy is generated from a hydro turbine. Power is the rate of producing energy. Power is measured in Watts (W) or kilowatts (kW). Energy is what is used to do work and is measured in kilowatt-hours (kWh) or megawatt-hours (MWh). The maximum hydropower power output is entirely dependent on how much head and flow is available at the site. Therefore, a large utility-scale hydro system could easily produce hundreds of Megawatts (MW). To put this in context, a 1 kW hydropower system could satisfy the annual electrical energy needs of one average home.

The low head site would need a physically large Kaplan type turbine inside a turbine house the size of a large garage because it would have to be physically large to discharge such a large volume of water with a relatively low pressure head across it.

The invention relates to producing large average 880 MWH daily per unit of clean renewable energy at low cost and with a very low initial investment cost per energy unit from wave, tidal and stream ocean water energy at offshore locations with up to 100 meters ocean floor depth using a towable mobile platform with 6 towers anchored to seabed. The hydro-turbine energy unit with 6 hydro turbines each is built during a short time with relatively low investment of a few million dollars and it could be ready to produce hydro-turbine energy within a few months of venture capital budgeting. The hydro-turbine energy unit operates with low maintenance and with continuous working around the clock for years using ocean water, an unlimited source of free energy.

Harvesting renewable offshore energy of ocean wave, tidal and stream energy, converting it to accumulated water head potential gravity energy in a large water volume pool secured over a platform that is secured to the ocean seabed. The trap pool water bottom outlets are connected to the inlet manifold of 6 high flow hydro turbines with their outlet port connected with divergence pipe into the surrounding ocean. Each hydro turbines' rotation shaft is coupled with an air compressor inlet shaft that compresses high pressure air into high pressure compressed air tanks where the energy is stored and is transferable to the land by naval means.

Other hydro turbine shafts coupled with electrical generator shafts and the electrical energy is stored in large capacity batteries that are transferable to the coast. Nevertheless, most of the renewable energy from the hydro-turbine units is converted to stored and transferrable compressed air pneumatic energy stored in air tanks located on the top of the unit towers together with the energy flowing control room. Electrical Energy is produced by converting compressed air energy to electrical energy by using a generator input shaft coupled to the turbine output shaft.

The objective of the invention is further related to harvesting hydropower from ocean high powerful wind flow over ocean water surfaces, The powerful wind creates water and high waves water head and water hydrostatic pressure applied to the walls and floor of the trap pool. The high wave water is captured into the hydro turbine unit trap pool through multiple inlet holes through holes through the wall and floor. The floor and the surrounding walls of the trap pool consists of thousands of tiles attached and sealed to each other each equipped with a thru inlet flow hole that is sealed equipped with a one way ball type check valve which keeps the water in the trap pool, building water head. The trap pool floor and walls are structurally supported and secured with 6 radial truss supports attached to 6 towers that are extended 20-35 meters above water level to oceans floor up to 100 meters deep with lateral support and with hammered plungers into-seabed.

The objective of the invention is further related to improve anchoring means and anchoring performance used for connecting floating objects including platforms, boats, ships and towers to the ocean floor seabed at depth up to 100 meters, using truss strengthened towers with pressurized air energy from air tanks located on floating platform to hammer pneumatic piston with plunger ends into the seabed in three dimensional directions. The new pneumatically reciprocating hammering arrow-shaped plungers into seabed replaces the anchor that used its own weight to sink into ocean seabed for thousands of years.

BRIEF DESCRIPTION OF THE PRIOR ART

Capturing hydro power is known in the art. Hydropower converts power obtained from tides into power, resulting in tidal energy.

other renewable energy capture devices, such as wind turbines, hydropower systems. Currently, wind energy and their corresponding turbines offer a technology that is effective in high sustained-wind regions. Wind turbines under 100-kilowatt cost between $3000 to $8000 per kilowatt of capacity with initial construction cost between $1.3-$2.2 million per MW of capacity. Wind has an average capacity factor of 25% to 33%, meaning that wind farms will only achieve their nameplate capacity rating ¼ to ⅓ of their run time. This is due to inconsistent wind speeds, variability in wind directions, and time periods when no wind is present. Prior art renewable energy sources typically require a backup energy source, such as fuel, to provide energy when the renewable source is unavailable, particularly when the renewable source is unpredictable in its availability.

Following are prior art patents and applications:
1. U.S. Pat. No. 11,072,401 B2 Inventor: Offshore Floating Living Premises, Lanoratory and submersible Plankton Tower Pump and submersible aerated research manned actuated vehicle. Inventor: Yona Becher Jul. 27, 2021
2. Application DE202011108819U events 2011 Dec. 8
3. Application filed by Walter Albrecht 2011 Dec. 8
4. Priority to DE202011108819U 2011 Jan. 27
5. Publication of DE202011108819U1
6. Publication of DE202011108819U1

Note: None of the above prior art relates to ocean offshore renewable energy hydro-turbines units.

None of the above prior art patents or publications related to a offshore ocean 'trap pool' that collects wave, tidal and stream energized water through check valves while being supported by truss construction towers extending to the ocean floor at 100 meter maximum and anchored to seabed soil with pneumatic reciprocating hammering type anchors.

None of the above prior art patents or publications related to offshore ocean hydro-turbines with water flowing from the bottom of a trap pool into manifolds with swirling vertical means before flowing back to the ocean.

BRIEF SUMMARY OF THE INVENTION

The object of the invention is to provide a mobile and towable offshore 880 MWh average daily clean and environmentally safe renewable energy production units of low cost and low investment maintenance free electrical and mechanical compressed air storable and transferable energy. The Renewable energy production unit comprises 6 radially equally spaced hydro-turbines powered continuously day and night by ocean water energy combination of wind powered waves, tidal energized water and thermal effect streaming water energy. The powerful water of all sources is captured in a water trap pool held fixed in height relative to ocean floor by 6 horizontal trusses connected to 6 tall vertical hexagonal truss towers that extends to ocean floor and fixed to the seabed up to 100 meter deep by pneumatically hammered plungers. The energized wave, tidal and stream water flows into the trap pool's floor and surrounding walls through thousands of thru holes sealed with plastic hollow ball type check valves that are spaced all over the floor and in the surrounding walls all around the 3 meters tall vertical walls of the pool and a round 100-meter diameter floor. The thousands of check valves equipped with movable and floating balls that allow the high energy powerful ocean waves, tide and stream flow into the trap pool only while preventing the head pressure of the pool accumulated from flowing back into the ocean. A channel U cross section channel ring. The trap pool with a 100 meter diameter of surrounding walls is strengthened by a structural circular U shape cross sectional circular channel ring along the walls of the pools, structurally attached to the floor supporting horizontal polygon truss. The circular U channel ring fixed to the pool's walls is structurally fixed to the six lateral horizontal trusses that are structurally fixed to 6 towers equally spaced radially 6 meters from the trap pool. The tall towers extend 15 meters above water level and up to 100 meters below water level to the ocean floor, secured to the seabed with 6n plunger that are pneumatically hammered into the seabed. The tall towers are structurally built to support living premises on the top of the tower and to keep a constant horizontal plane height of the trap pool floor relative to the seabed. The powerful ocean waves, tidal rising water and stream rising water enter the water trap pool and build head relative to the ocean water level outside the trap pool. Six renewable energy hydro turbine units are structurally attached to a circular U shape channel ring along the walls of the trap pool with 6 radial inlet port openings measured 4 meters height and 8 meters wide cut through the U channel ring support and the circular pool wall. The water trapped in the pool with up to 3 meters head above surrounding ocean water level flows under water potential energy head pressure into the 6 hydro-turbine unit horizontal inlet ports continuously night and day. When water leaves the trap pool, the height of the water decreases and new water enters from outside the trap pool from the surrounding ocean. Once the water enters into the hydro turbine circular manifold with cross sectional area reduced gradually along the circular manifold that is also equipped with guiding vanes that swirl the water into the center of the circular manifold center converging pipe of 3 meters diameter. The swirling water is guided by a conical shape top to turn downwards in 90 degrees into the vertical converging pipe and down towards the turbine blades. The high water flow at estimated 20 cubic meters per second flows around 8 guiding vanes, causing the rotation of the turbine which is supported by low friction bearings above and below the turbine manifold to rotate by applying combined tangential force on the high pitch helical surface of the turbine blades. Once passing through the turbine blades, the swirled water flow speed increases as the water head pressure is reduced flowing through the divergence portion of the vertical draft pipe. The water flows whirling downwards into a vertical convergence-divergence draft pipe lateral outlet merging into the external ocean water at atmospheric pressure, below the height of the water level head of the water trap pool. The vertical shaft of the hydro turbine of the typical Kaplan design turns under the vertical swirling water torque applied to the turbine blades that is coupled to a lobe type air compressor with a transmission belt with right speed ratio. The compressed air from the lobe type compressor is flowing through pipe and air check valve to a high pressure air tank and is stored in an air tank that is located on the platform floor.

The platform consists of four renewable energy production units each consisting of a trap pool, six towers and 6 hydro-turbine units. The floating platform is towable and mobile with stored and transferrable pressurized air tanks and local electrical energy generator operated by air motor. The electrical power is used on the platform for pneumatic tower pumps that pump plankton from the bottom of the ocean up to 100 meters deep. The center of the tap pool is also used to grow fish and plankton that is pumped by the tower pumps from the bottom of the ocean floor.

The present invention is offering a novel long-standing need for a renewable energy that optimally continuously extracts head-driven water potential energy with minimal if any negative environmental effects, thereby allowing for the extraction of renewable energy from offshore ocean in met by the invention

BRIEF DESCRIPTION OF THE DRAWINGS

For a fuller understanding of the invention, reference should be made to the following detailed description, taken in connection with the accompanying drawings, in which:

FIG. 1 presents four renewable energy hydro turbine units, each consisting of 6 hydro turbines together with a central platform with living premises and with upper and lower service decks.

FIG. 2 presents the side view of a tower with compressed-air tank, tower living premises and with tower seabed anchoring unit

FIG. 3 present the top view of the renewable energy hydro turbine unit.

FIG. 4E presents a bottom view of the seabed anchoring unit.

FIG. 4F presents a cross-sectional view of the seabed anchoring hammering unit at fully extended arrow-shaped plunger position

FIG. 53 presents a top view of hydro-turbine and trap pool

| List of Reference Number of Parts and Assemblies in FIGS. | | |
|---|---|---|
| Number # | name | FIG. |
| 1 | Hydro Turbine unit | 1, 1A, 1B, 1C |
| 2 | Living premises on tower | 2, 2A, 2D, 3B, 3G |
| 3 | Turbine assembly | 2C, 2E, 3A, 3B, 3F, 5, 5A |
| 4 | Seabed anchoring, tower | 2, 2C, 3G, 4, 4E |
| 5 | tower | 2, 2C, 2E, 3B, 3F, 3G, 4 |
| 6 | Lateral support, tower | 2E, 3F, 5 |
| 7 | Trap pool assembly | 2B, 3, 3A, 3B, 3F, 3G, 5J |
| 8 | Floor, Trap pool | 2E, 3 |
| 9 | Walls, trap pool | 3, 3B |
| 10 | U channel ring | 5A, 5D |
| 11 | Pool radial support | 3, 3B |
| 12 | Trap Pool radial trusses | 3, 3B |
| 13 | Floor tile assembly | 3D |
| 14 | Floor tile | 3D, 3E |
| 15 | Check valve ball | 3C, 3E |
| 16 | Check valve radial seal | 3C |
| 17 | Platform, control tower | 1 |
| 18 | Turbine inlet adaptor | 2E, 3, 5A, 5G |
| 19 | Turbine, inlet manifold | 3, 3A, 5E, 5F |
| 20 | Turbine guide vanes | 5B, 5C |
| 21 | Turbine shaft | 5B, 5C |
| 22 | Turbine blades | 5, 5C |
| 23 | Turbine convergence taper | 5B, 5C, 5E |
| 24 | Turbine draft pipe | 5C, 5E |
| 25 | Turbine divergence outlet | 5C, 5E, 5F |
| 26 | air compressor | 3A, 5A, 5B |
| 29 | Air compressor shaft | 5F |
| 30 | Compressed air tank | 2A, 2B, 2D |
| 31 | Trap pool central support | 3A |
| 32 | Tower section | 2A |
| 33 | Tower section bolt | 2A |
| 34 | Tower renewable energy control room | 2A, 2D |
| 35 | Tower trusses | 4, 4A |
| 36 | Arrow-shaped plunger, seabed anchor | 4, 4A, 4B, 4D, 4E |
| 37 | anchor hammer cylinder | 4, 4A, 4B, 4C, 4D, 4F |
| 38 | anchor hammer stepped piston | 4A, 4B, 4C, 4D, 4F |
| 39 | anchor hammer return spring | 4A, 4B, 4C, 4D |
| 40 | anchor hammer limit pin | 4C |
| 41 | anchor hammer upper inlet | 4C |
| 42 | anchor hammer lower inlet | 4C |
| 43 | anchor top large cylinder | 4A, 4E, 4G |

-continued

List of Reference Number of Parts and Assemblies in FIGS.

| Number # | name | FIG. |
| --- | --- | --- |
| 44 | anchor top large piston | 4A |
| 45 | Anchor hammer unit | 4A, 4C, 4E, 4G |
| 46 | Anchor hammer lower cylinder | 4D |

DETAILED DESCRIPTION OF THE INVENTION

FIG. 1 presents a mobile and towable offshore for producing renewable energy with 880 MWh average daily continuously clean, environmentally safe and ocean-habitat-safe renewable energy production. It presents four renewable energy hydro turbine units 1 together with a platform 17 with living premises, control tower and deck.

Figure 1A:
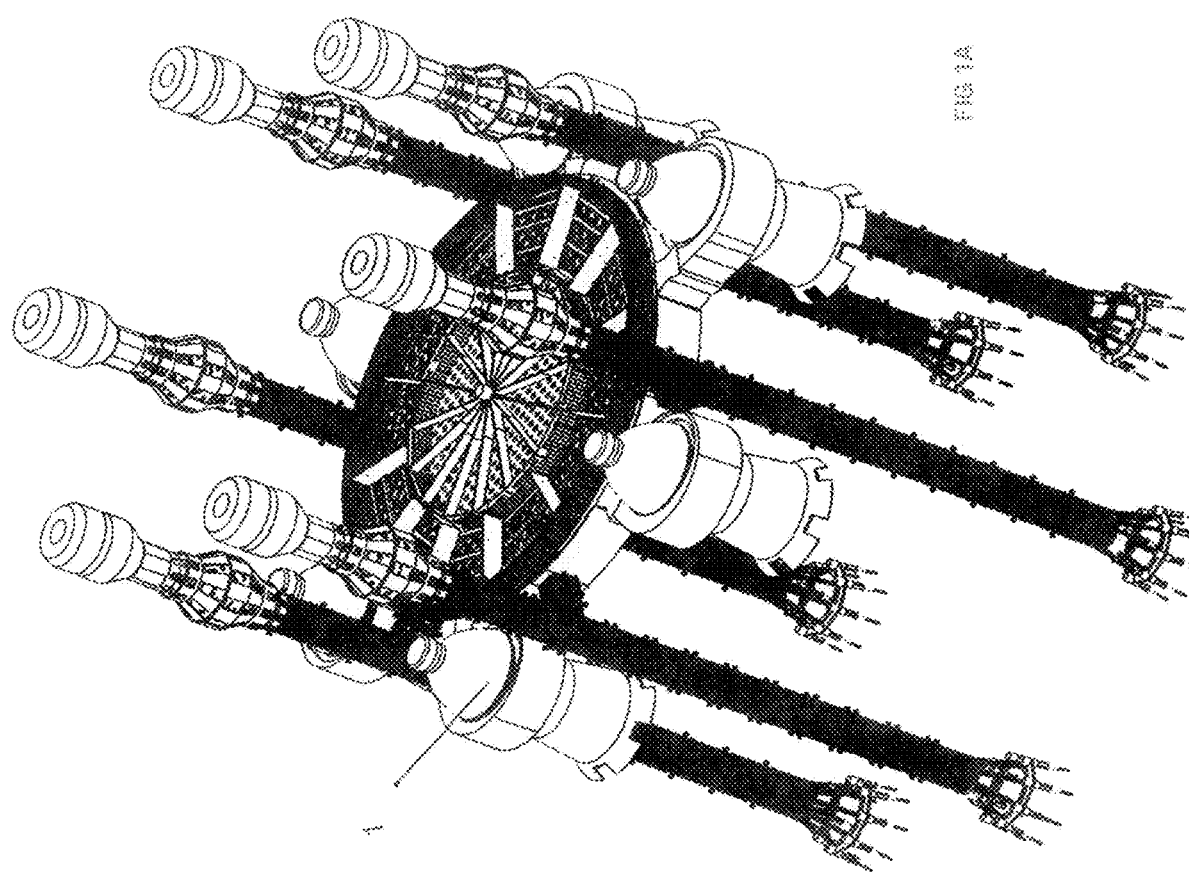
FIG. 1A presents the top view of a renewable energy hydro turbine unit with 6 towers with compressed air tanks, trap pool and 6 hydro turbines.

FIG. 1A presents the top view of the renewable energy hydro-turbine production unit, each comprising 6 radially equally spaced hydro-turbines assembly 3 that are powered continuously day and night by ocean water energy combination of wind powered waves, tidal energized water and thermal effect streaming water energy.

Figure 1B:
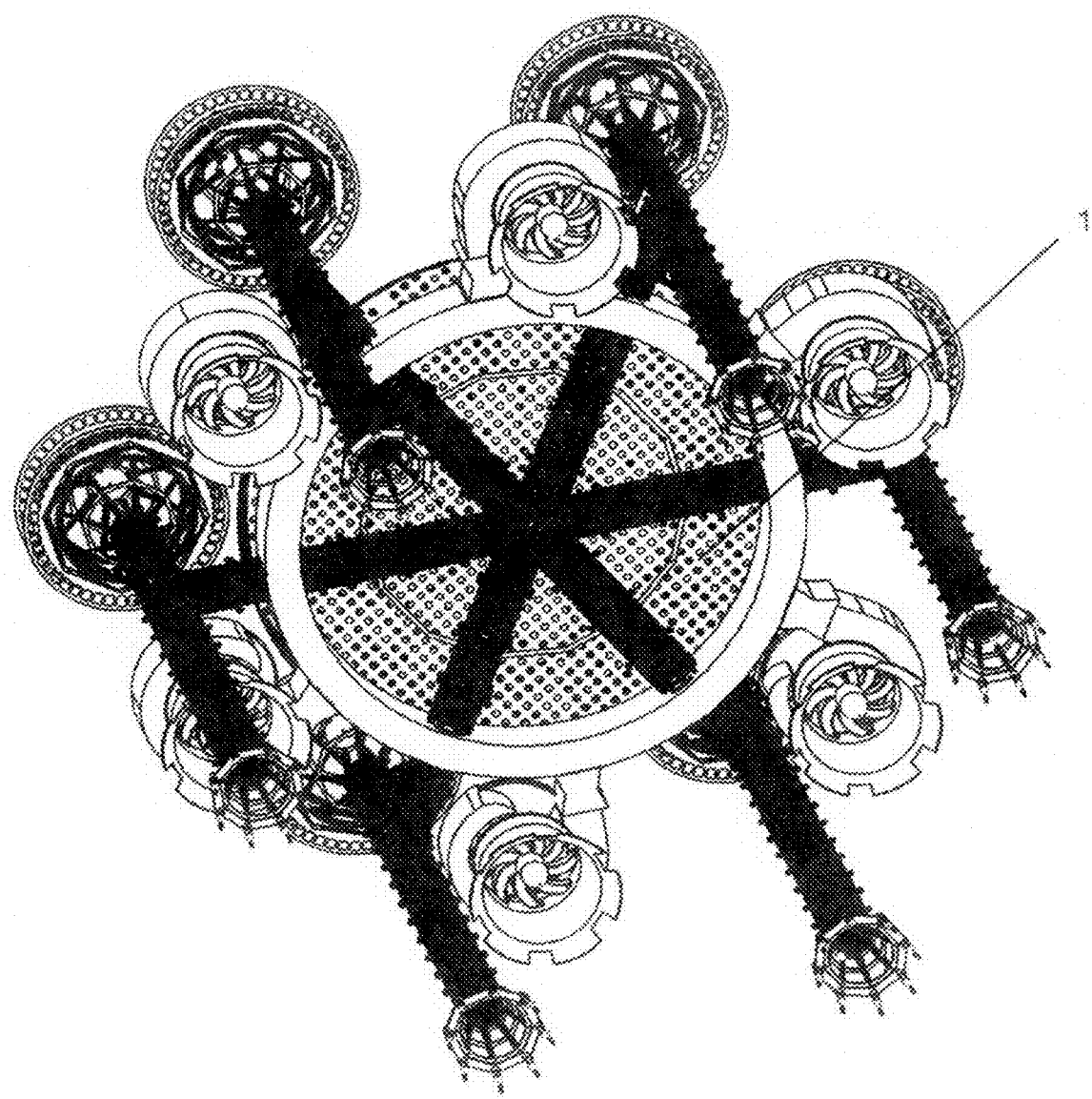
FIG. 1B presents the bottom view of a renewable energy hydro turbine unit with 6 towers with living premises, a trap pool and 6 hydro turbines.
Figure 1C:
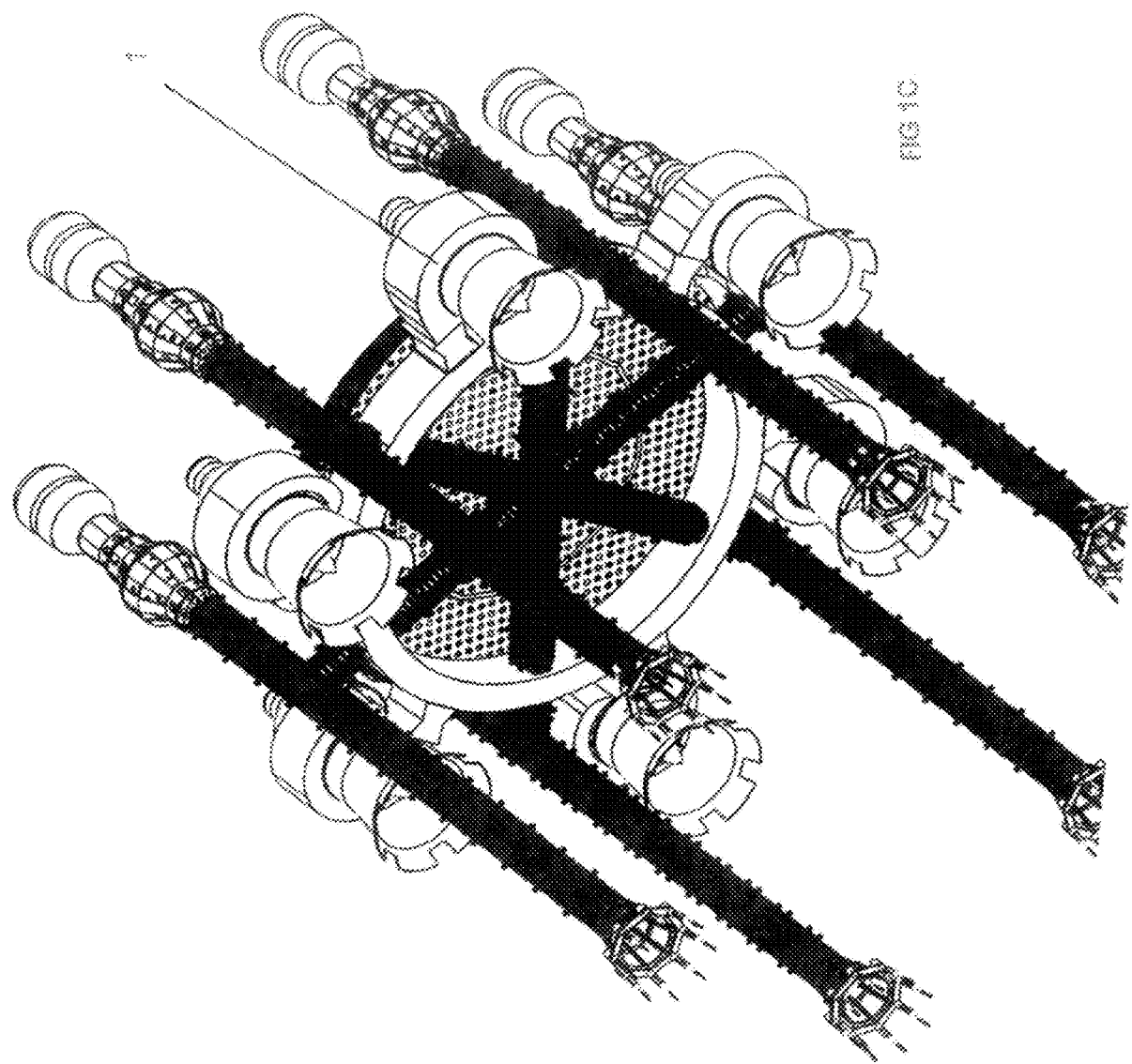
FIG. 1C present side view of renewable energy hydro turbine unit with 6 towers with compressed air tanks, trap pool and 6 hydro turbines.
Figure 2A:
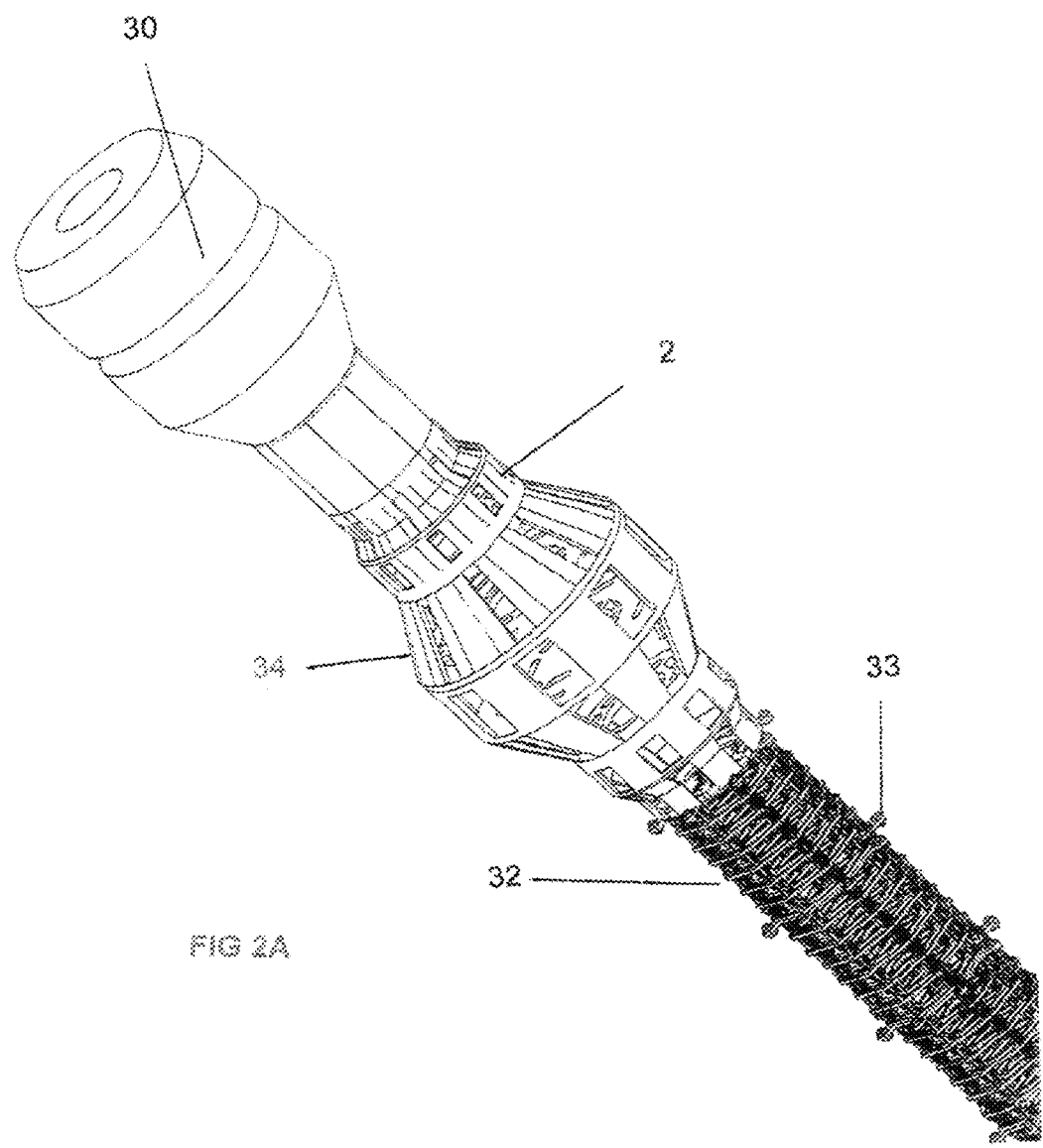
FIG. 2A presents a partial top upper view of the tower with compressed air tank and with multiple truss-built bolted tower sections
Figure 2B:
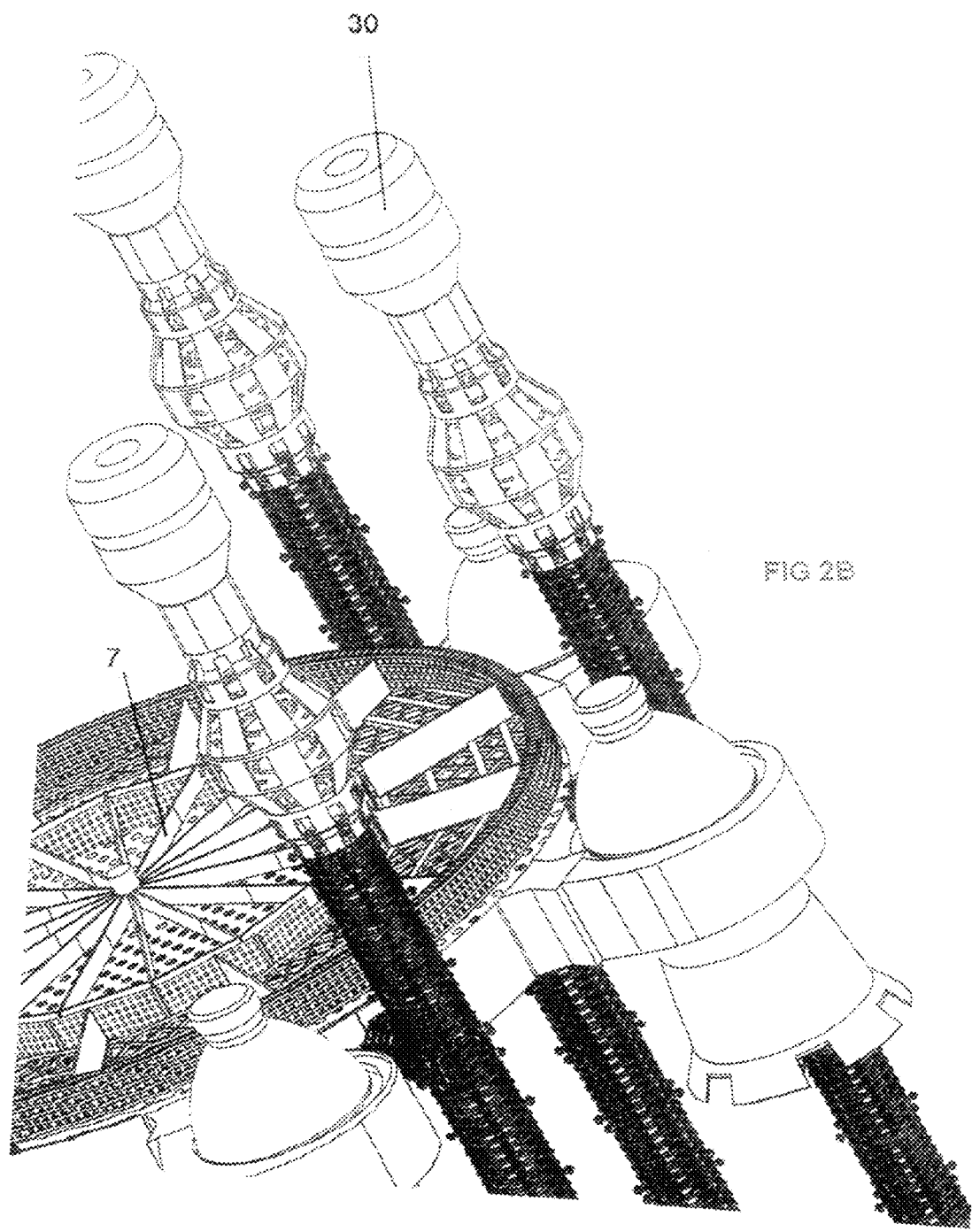
FIG. 2B presents a partial view of the renewable energy hydro turbine unit.
Figure 2C:
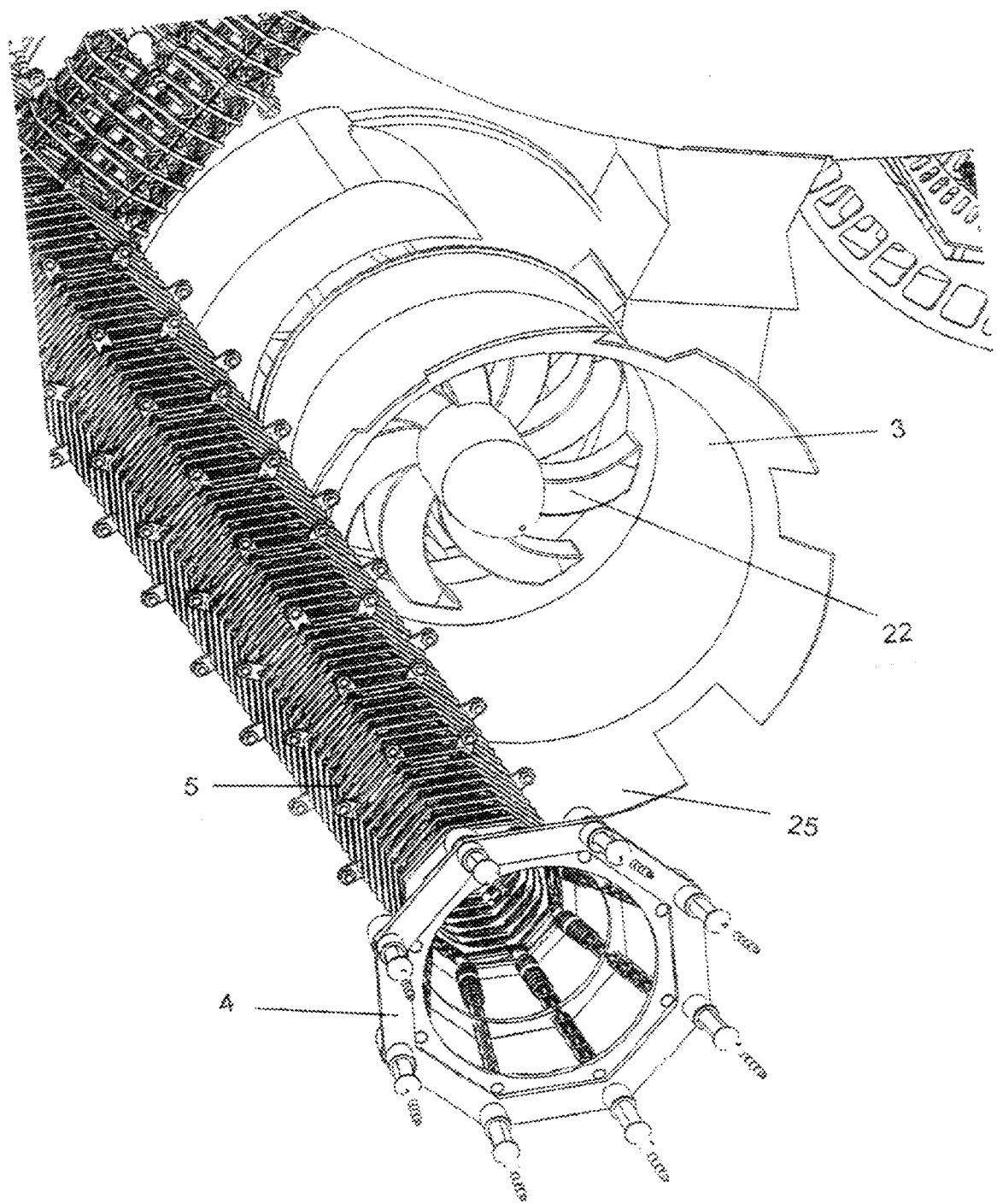
FIG. 2C presents the bottom partial view of the renewable energy hydro turbine unit.
Figure 2D:
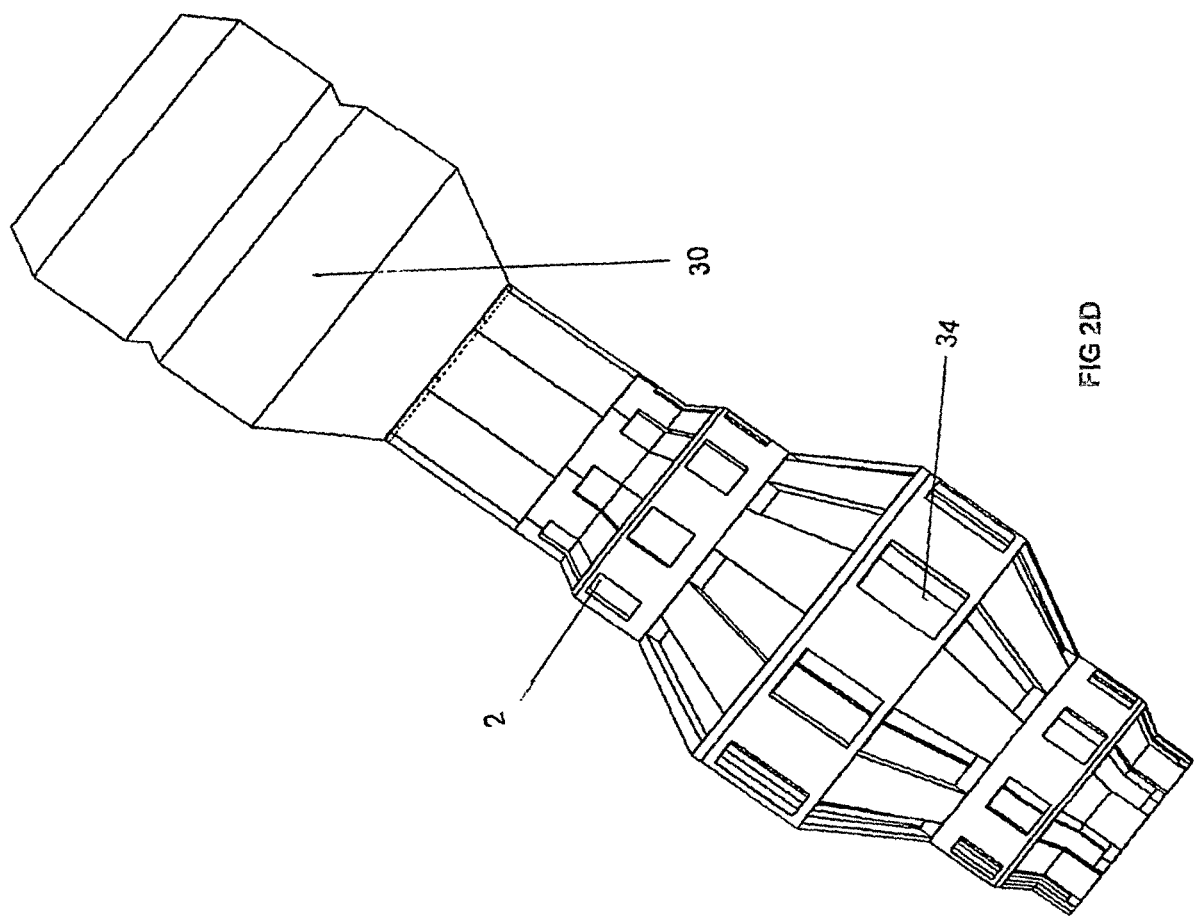
FIG. 2D presents the side view of a compressed air tank.
Figure 2E:
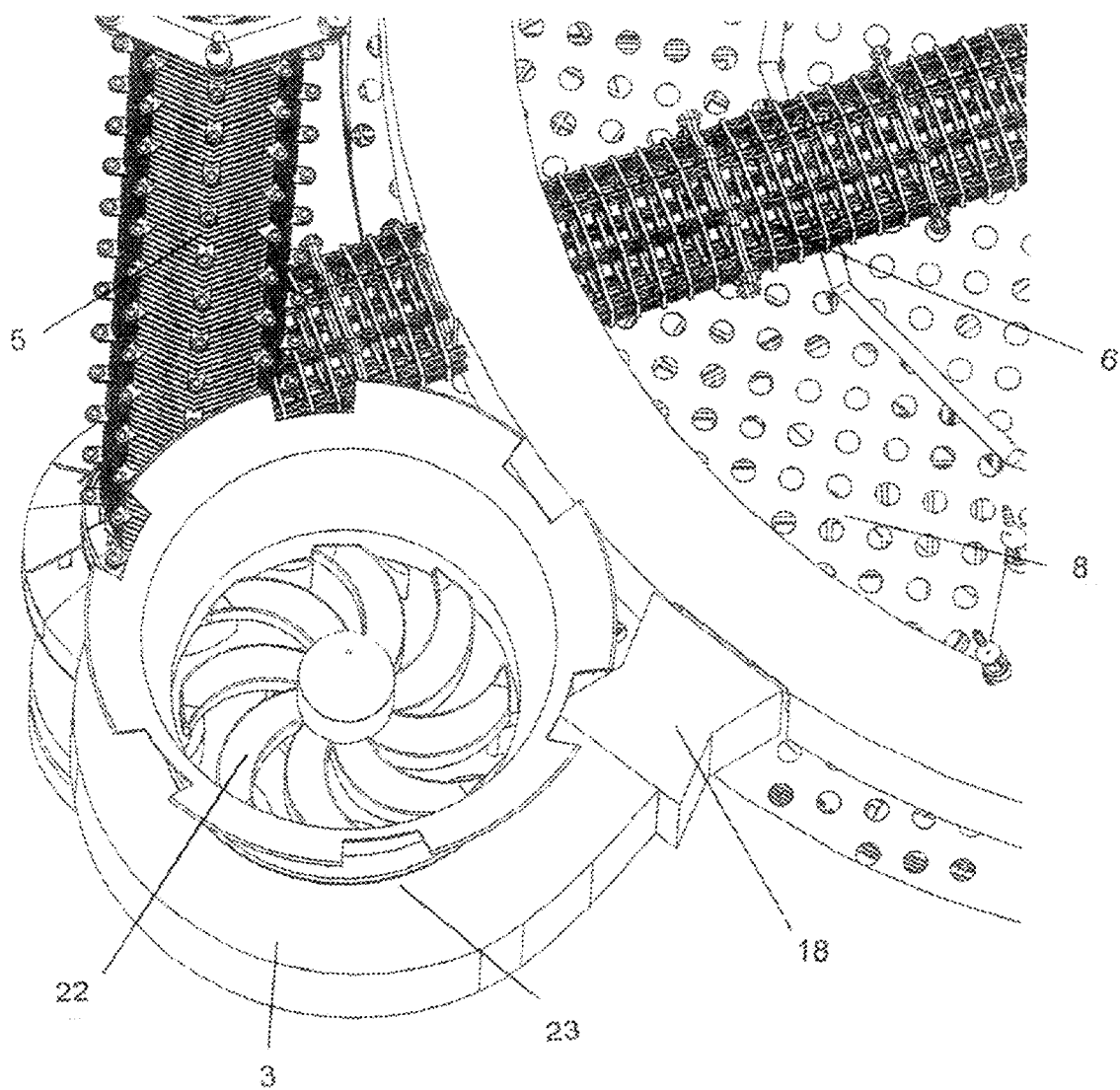
FIG. 2E presents the bottom view of the renewable energy hydro turbine unit.
Figure 3A:
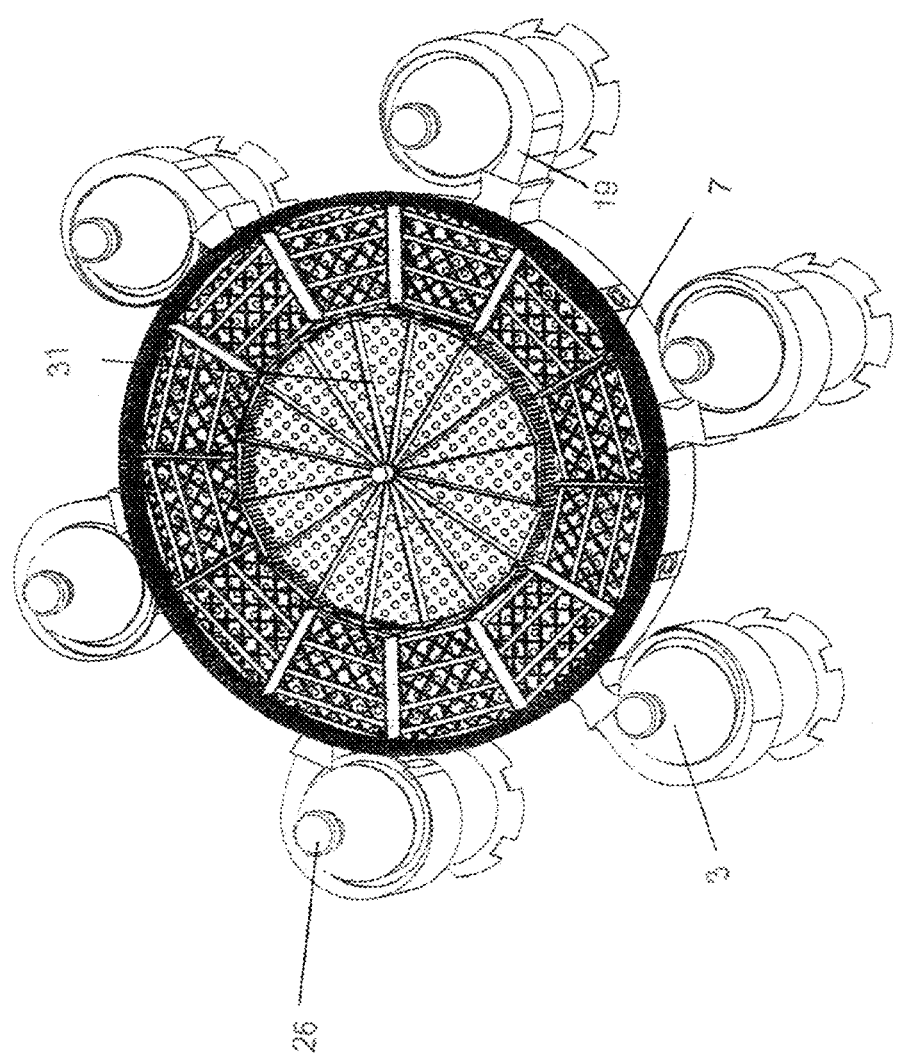
FIG. 3A presents the top view of the renewable energy hydro turbine unit outlet port.
Figure 3B:
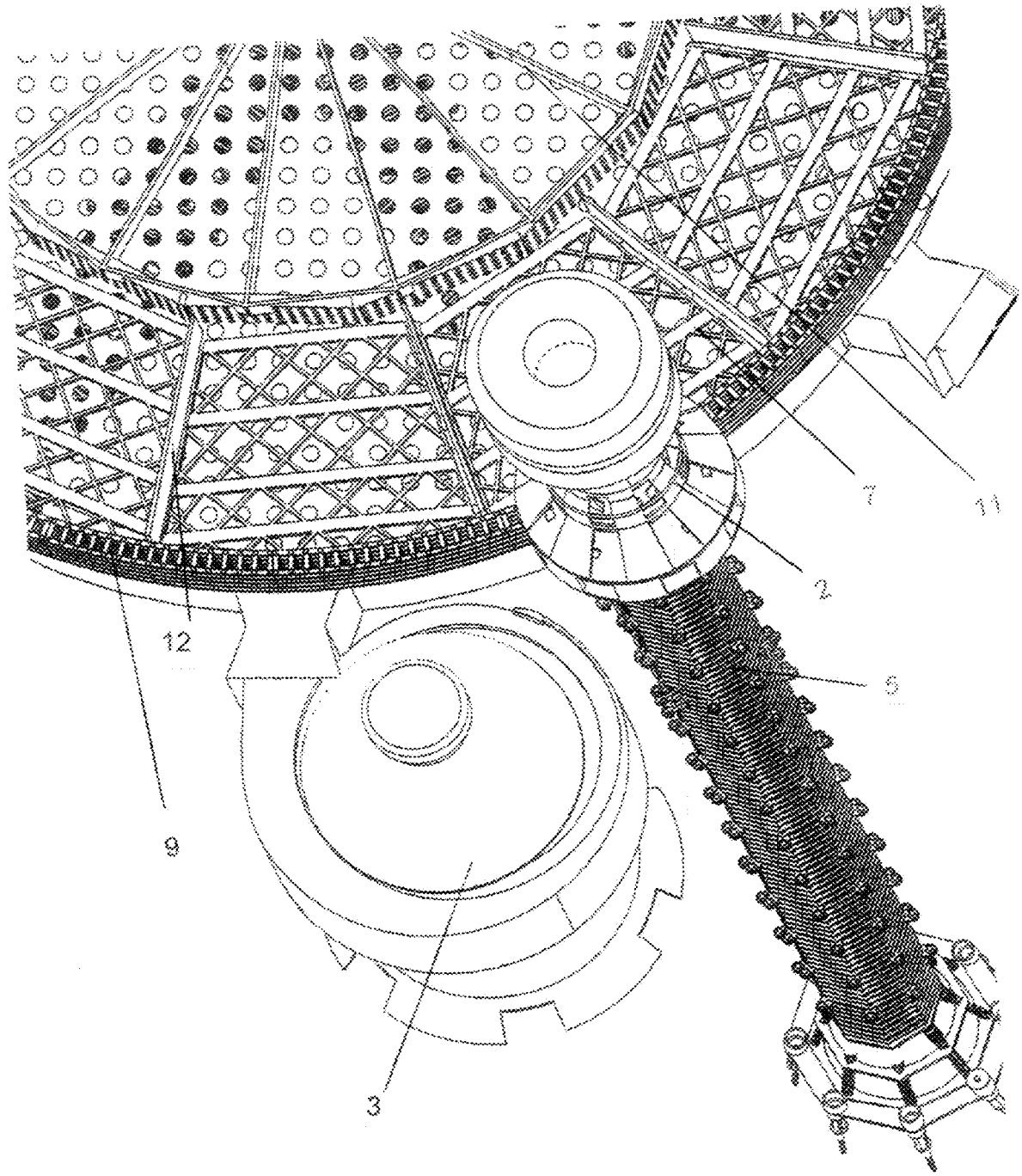
FIG. 3B presents a partial top view of the trap pool, trap pool walls and trap pool floor.
Figure 3C:
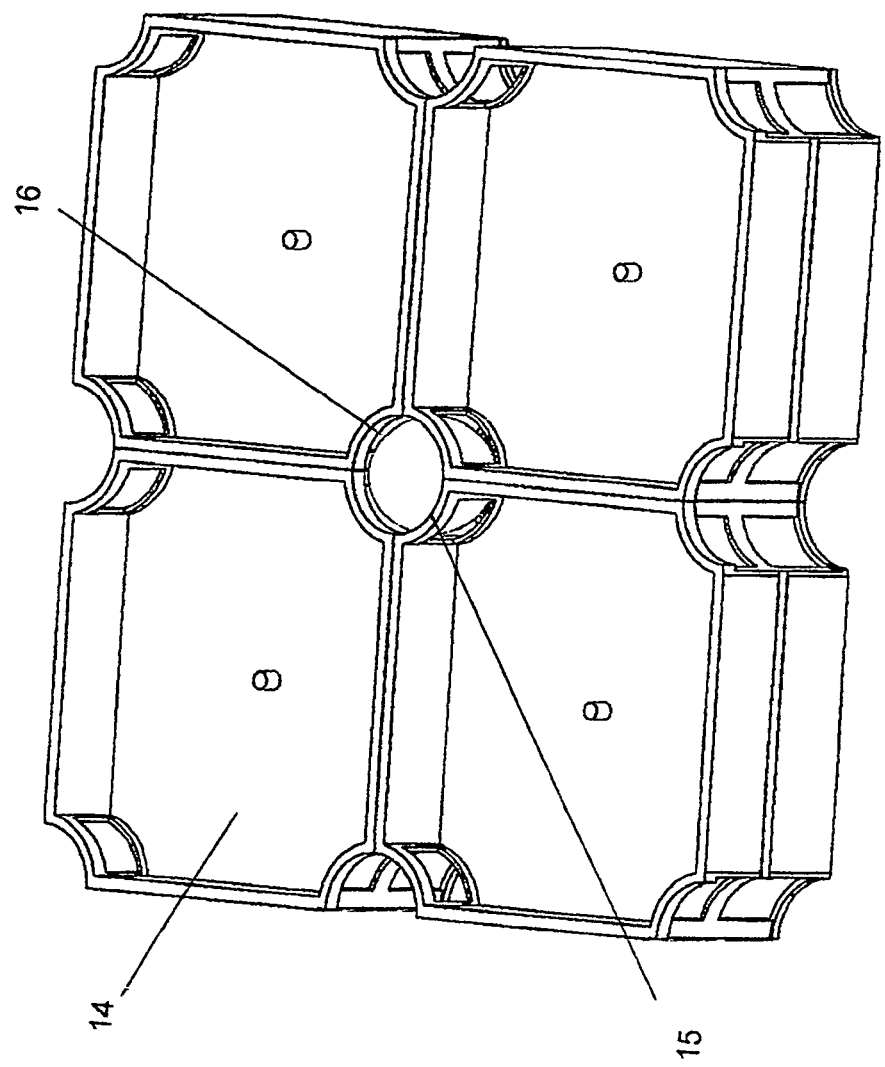
FIG. 3C presents the view of trap pool floor tile.
Figure 3D:
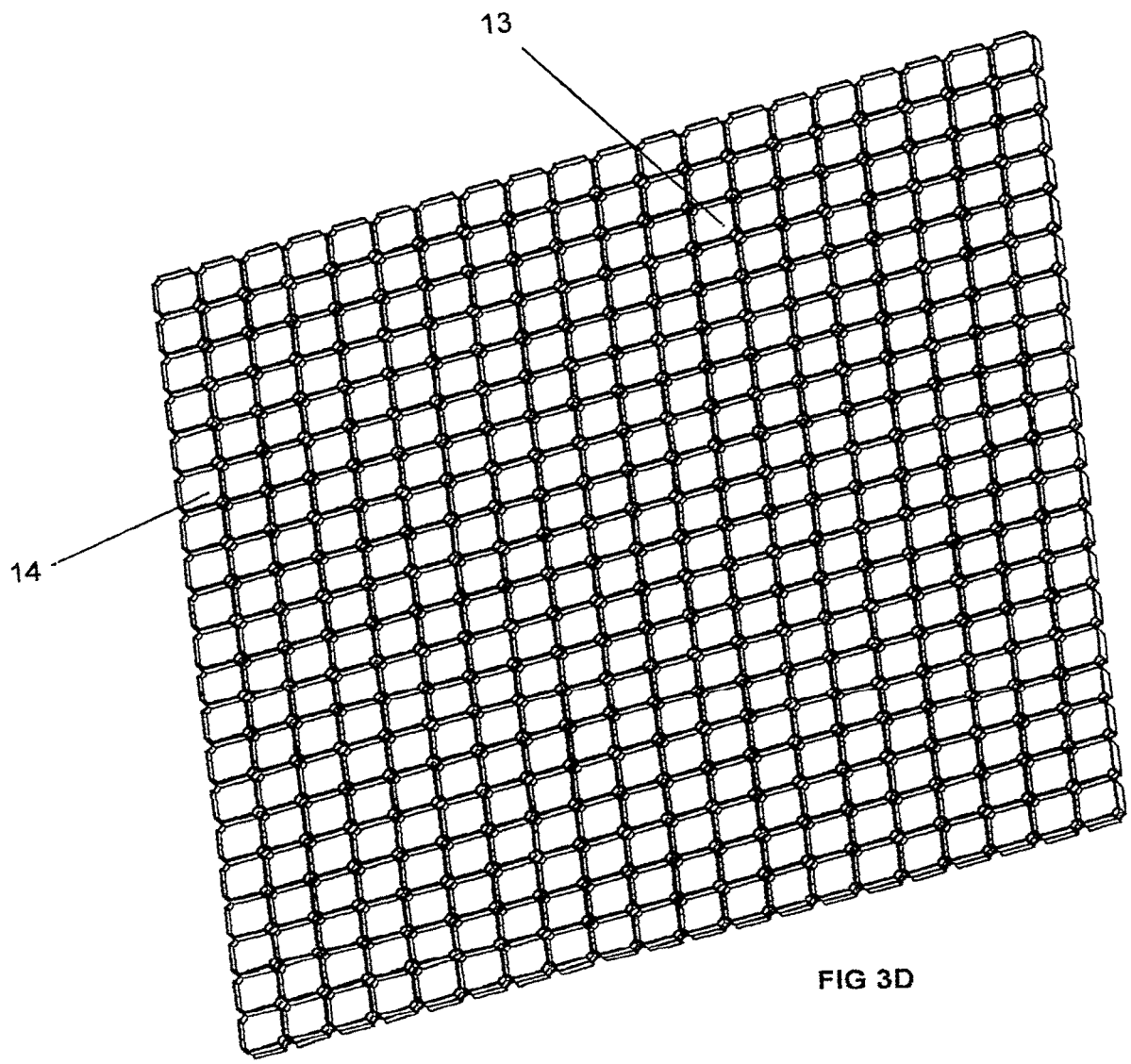
FIG. 3D presents the top view of a trap pool floor tile grid.
Figure 3E:
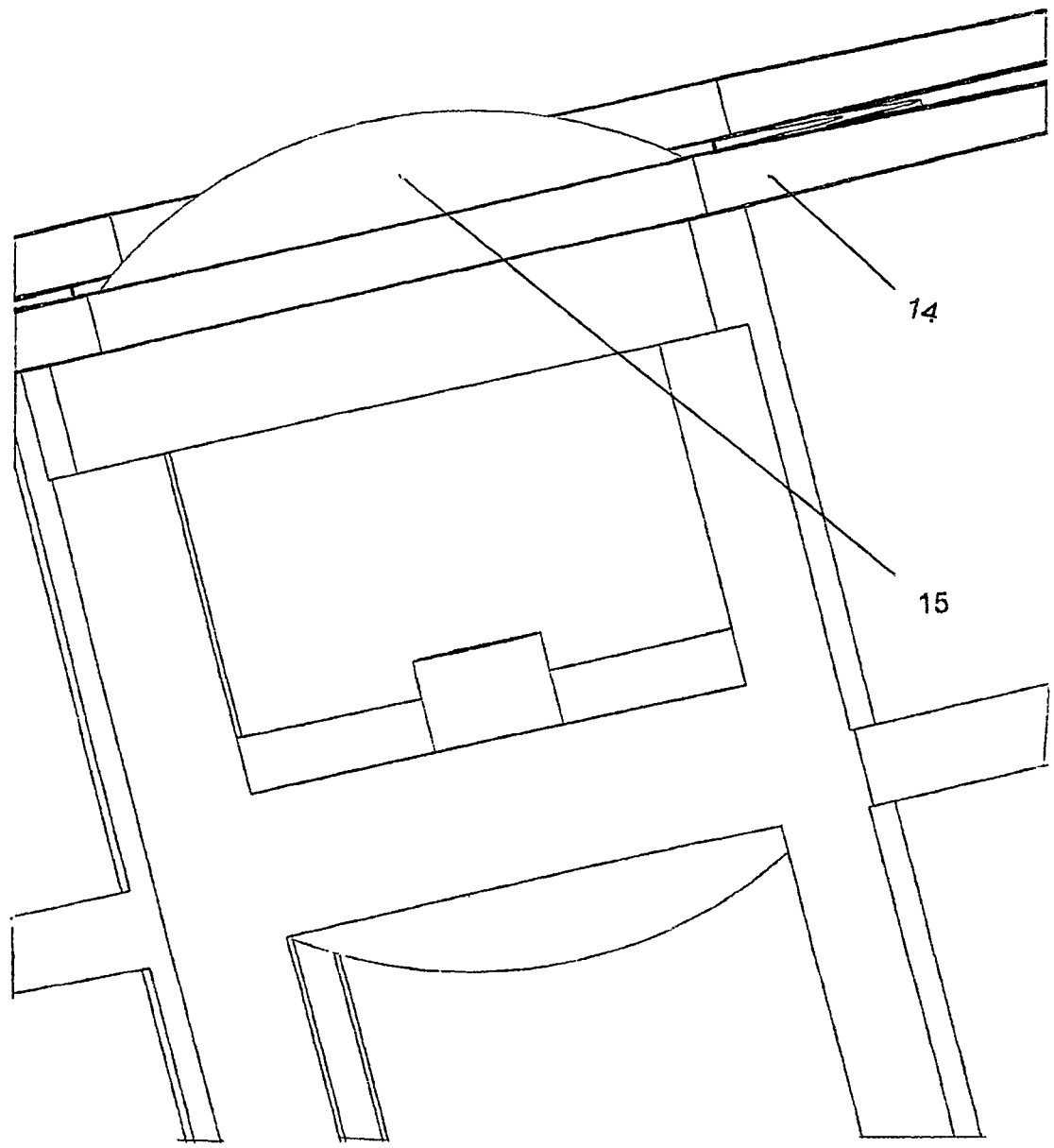
FIG. 3E presents a side view of the trap pool check valve.
Figure 3F:
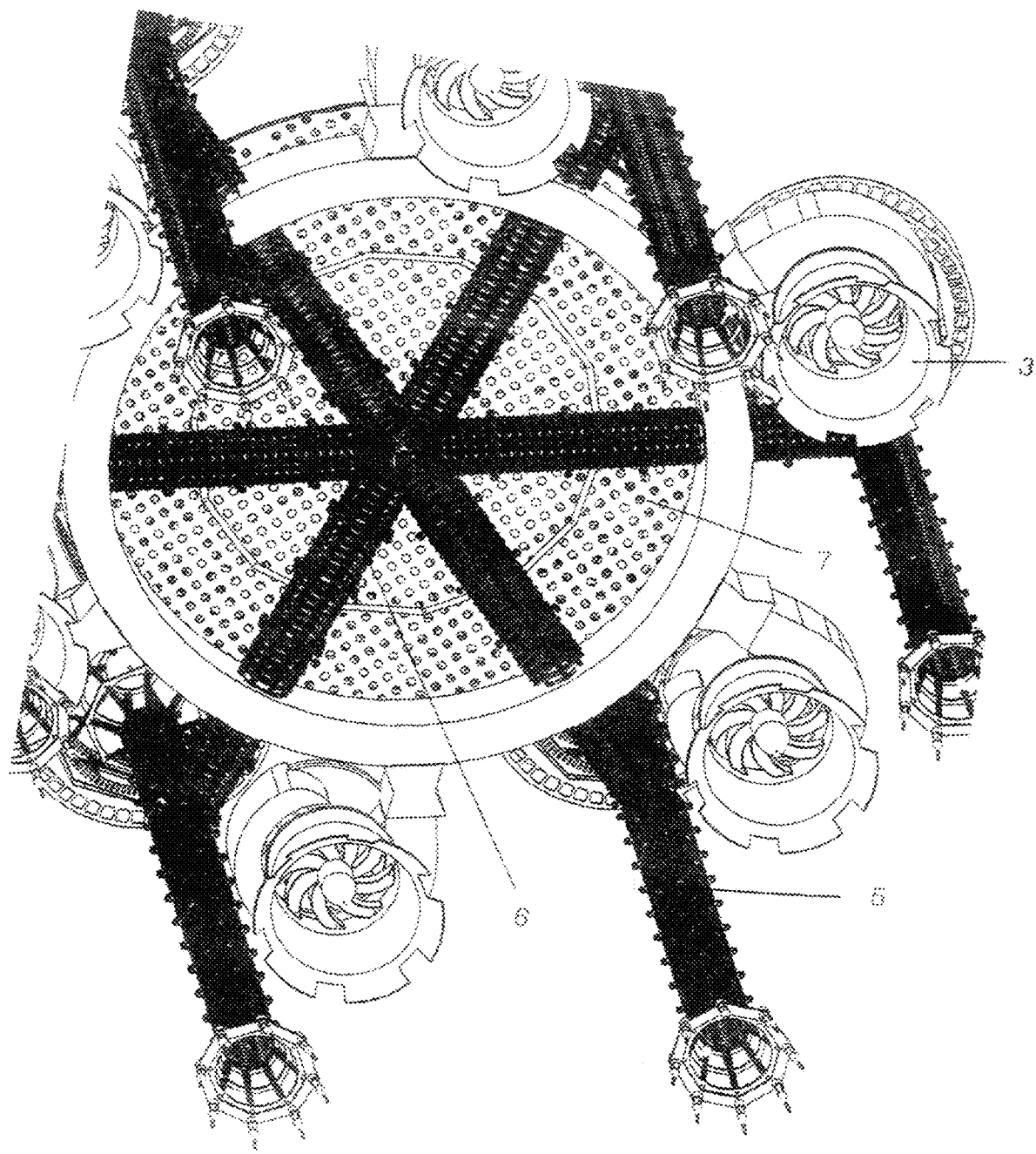
FIG. 3F presents the bottom partial view of the renewable hydro turbine unit.
Figure 3G:
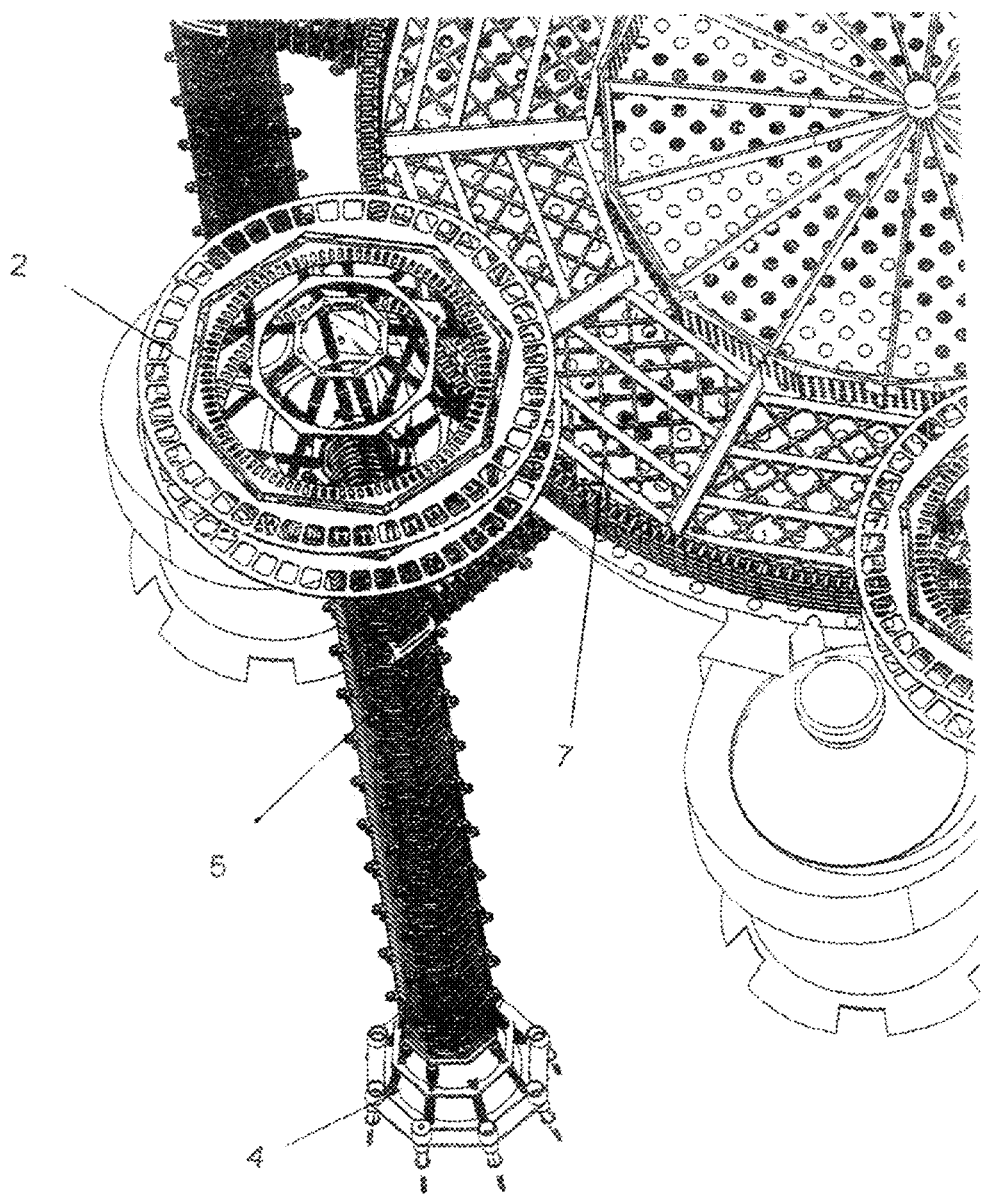
FIG. 3G presents a partial top view of tower and trap floor support and large tower living premises.

FIG. 1B presents the bottom view of a renewable energy hydro turbine unit with 6 towers with living premises, a trap pool and 6 hydro turbines. The powerful water of all sources is captured in a water trap pool assembly 7 held fixed in height relative to ocean floor by 6 horizontal trusses connected to 6 tall vertical hexagonal truss towers that extends to ocean floor and fixed to the seabed up to 100 meter deep by pneumatically hammered plungers. FIG. 1C presents the side view of a renewable energy hydro turbine unit with 6 towers with compressed air tanks, trap pool and 6 hydro turbines. The energized wave, tidal and stream water flows into the trap pool's floor and surrounding walls through thousands of thru holes sealed with plastic hollow ball type check valves that are spaced all over the floor and in the surrounding walls all around the 3 meters tall vertical walls of the pool and a round 100-meter diameter floor.

FIG. 2 presents the side view of a tower 5 with tower seabed anchoring unit 4, living premises on tower 2, and a compressed air tank 30. FIG. 2A presents the top upper portion of the tower with multiple truss built tower sections 32 bolted to each other with tower section bolts 33. FIG. 2B presents a partial view of the renewable energy hydro turbine unit with trap pool 7 that is built with thousands of check valves in floor tile units equipped with movable balls for maximum inlet flow to the trap pool, allowing the high energy powerful ocean waves, tide and stream flow into the trap pool only while preventing the head pressure of the pool accumulated from flowing back into the ocean. FIG. 2C presents the bottom partial view of the renewable energy hydro turbine unit, with turbine assembly 3, turbine blades 22, and turbine divergence outlet 25. FIG. 2D presents a side view of the compressed air tank 30 with tower renewable energy control room 34. FIG. 2E presents the bottom view of the renewable energy hydro turbine unit with turbine Convergence taper 23, and with 6 tower lateral support 6 that provide structural support to trp pool floor 8.

FIG. 3 present the top view of the renewable energy hydro turbine unit, Water trapped in the trap pool 7 creating high hydrostatic pressure on trap pool floor floor 8, entering U channel ring 10 open top side and flowing into with turbine inlet manifold 19 through turbine inlet adaptor 18 connected to U channel radial flow outlets. The U Channel ring 10 and trap pool walls 9 are supporting floor tile assembly 13 with pool radial support 11 and radial truss 12. FIG. 3A presents the top view of the renewable energy hydro turbine unit with 6 air compressors 26 and with trap pool central support 31. FIG. 3B presents a partial top view of the trap pool, trap pool walls and trap pool floor. FIG. 3C presents the view of trap pool floor tile 14 with check valve radial seal 16 keeps tight sealing of the check valve ball in closed position with hydrostatic pressure pressing the ball against the radial seal in the floor tile, preventing water escaping the trap pool through the trap pool floor and walls. FIG. 3D presents the top view of a trap pool floor tile grid 13, comprising thousands of floor tiles 14 secured to each other side walls to create a water sealed floor and side walls. Each Floor tile 14 has a central hole and four quarter corner walls where a check valve floating ball moves freely towards the trap pool to open the flow path for water from outside the trapo pool to enter into it through a one-way check valve. FIG. 3E presents the side view of the trap pool check valve, showing the check valve ball in open position, allowing flow from outside the trap pool inwards. FIG. 3F presents the bottom partial view of the renewable hydro turbine unit with 6 turbines 3 and with 6 tower lateral support 6 supporting the trap pool assembly 7, keeping the water trapped in the trap pool at constant height relatives to seabed, regardless of ocean water level changes, thereby creating water potential hydrostatic energy buildup in the pool while water flowing down into 6 turbine inlet flow adaptor into turbine manifolds. FIG. 3G presents a partial top view of tower and trap floor support and large tower living premises 2 intended for the extended time accommodation of guests and for the energy production maintenance team.

Figure 4:
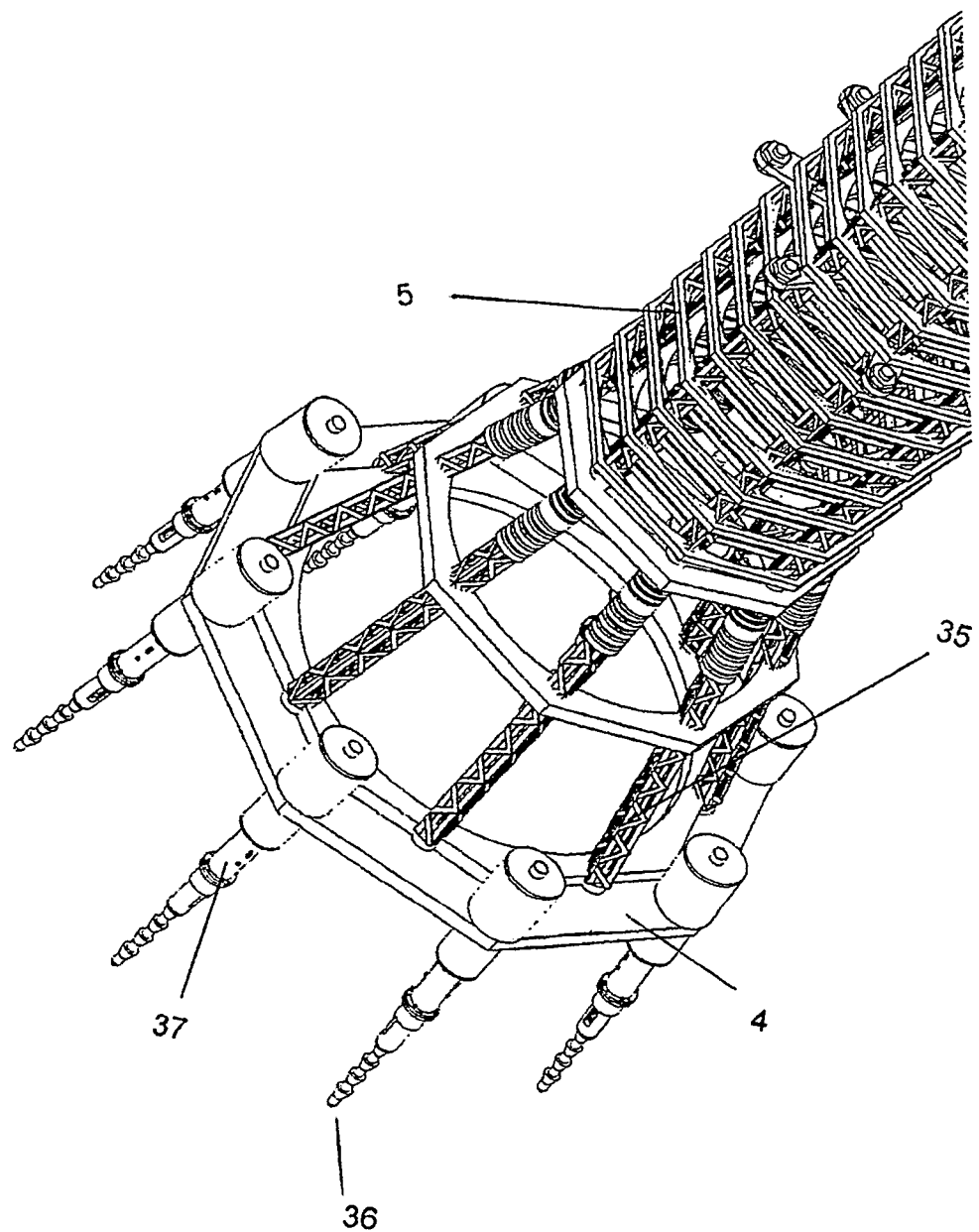
FIG. 4 presents a detailed view of tower bottom with seabed anchoring unit.
Figure 4A:
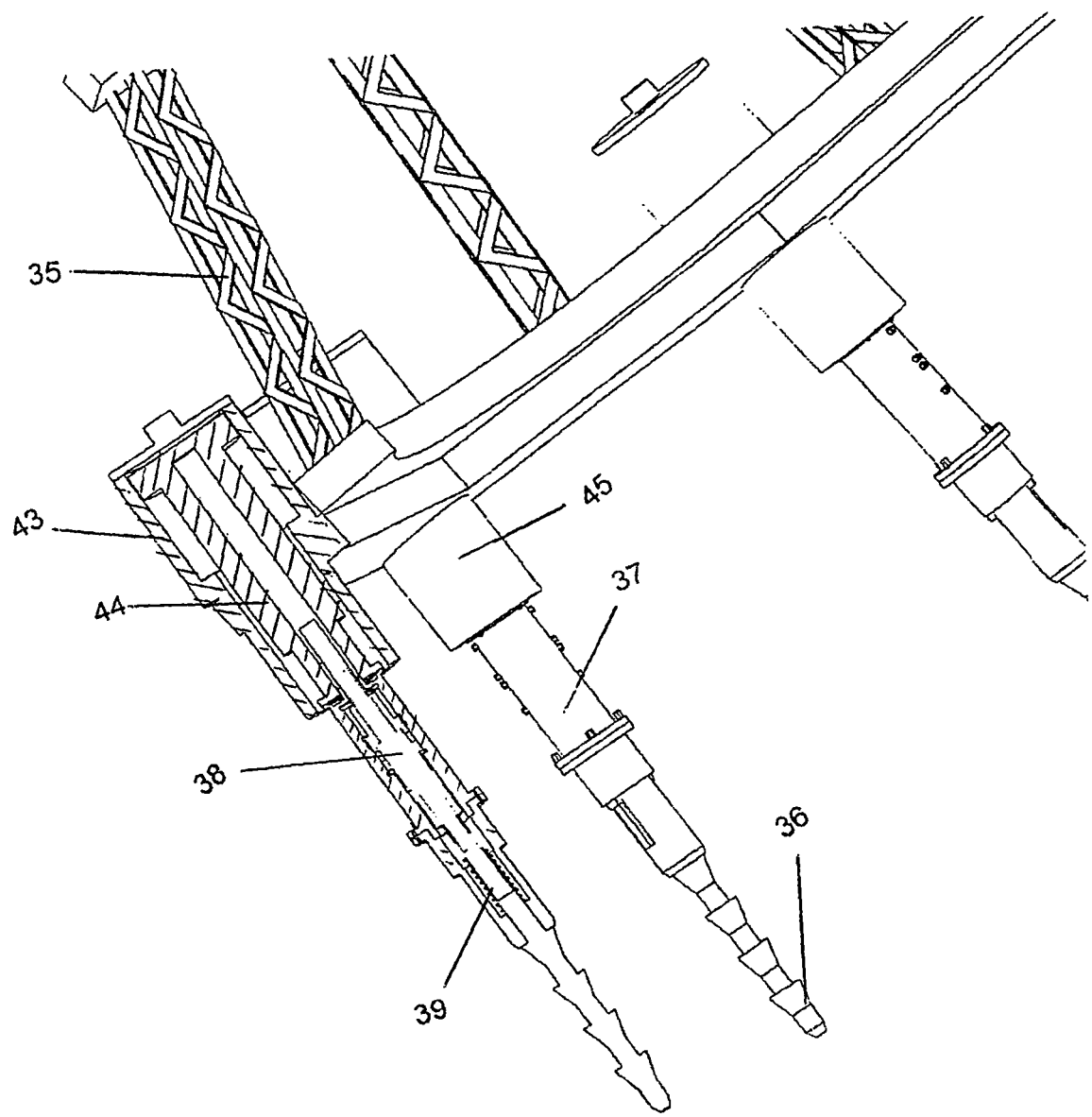
FIG. 4A presents a detailed view of seabed anchoring hammering cylinder.
Figure 4B:
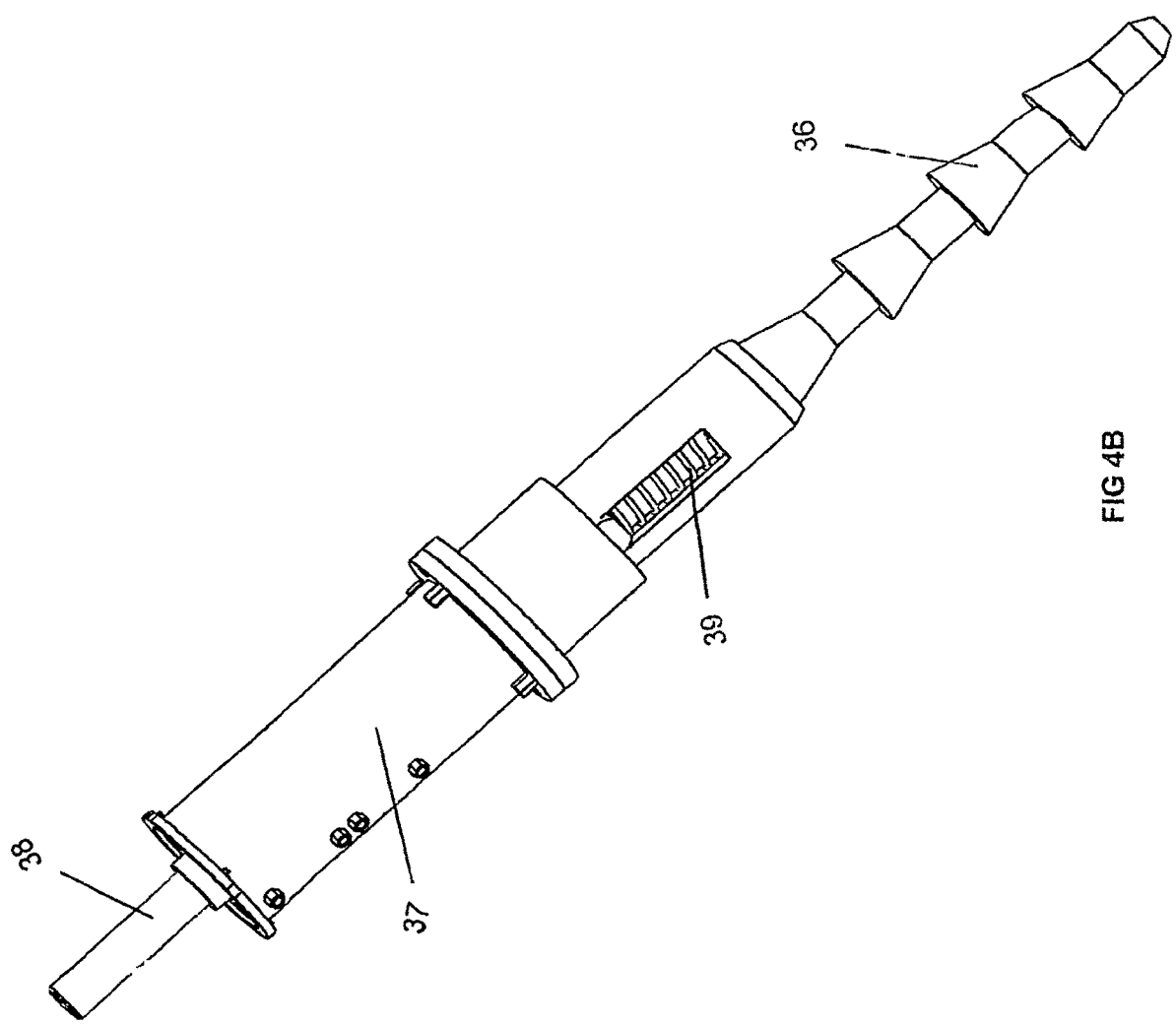
FIG. 4B presents a detailed view of the seabed hammering cylinder of the anchoring unit.
Figure 4C:
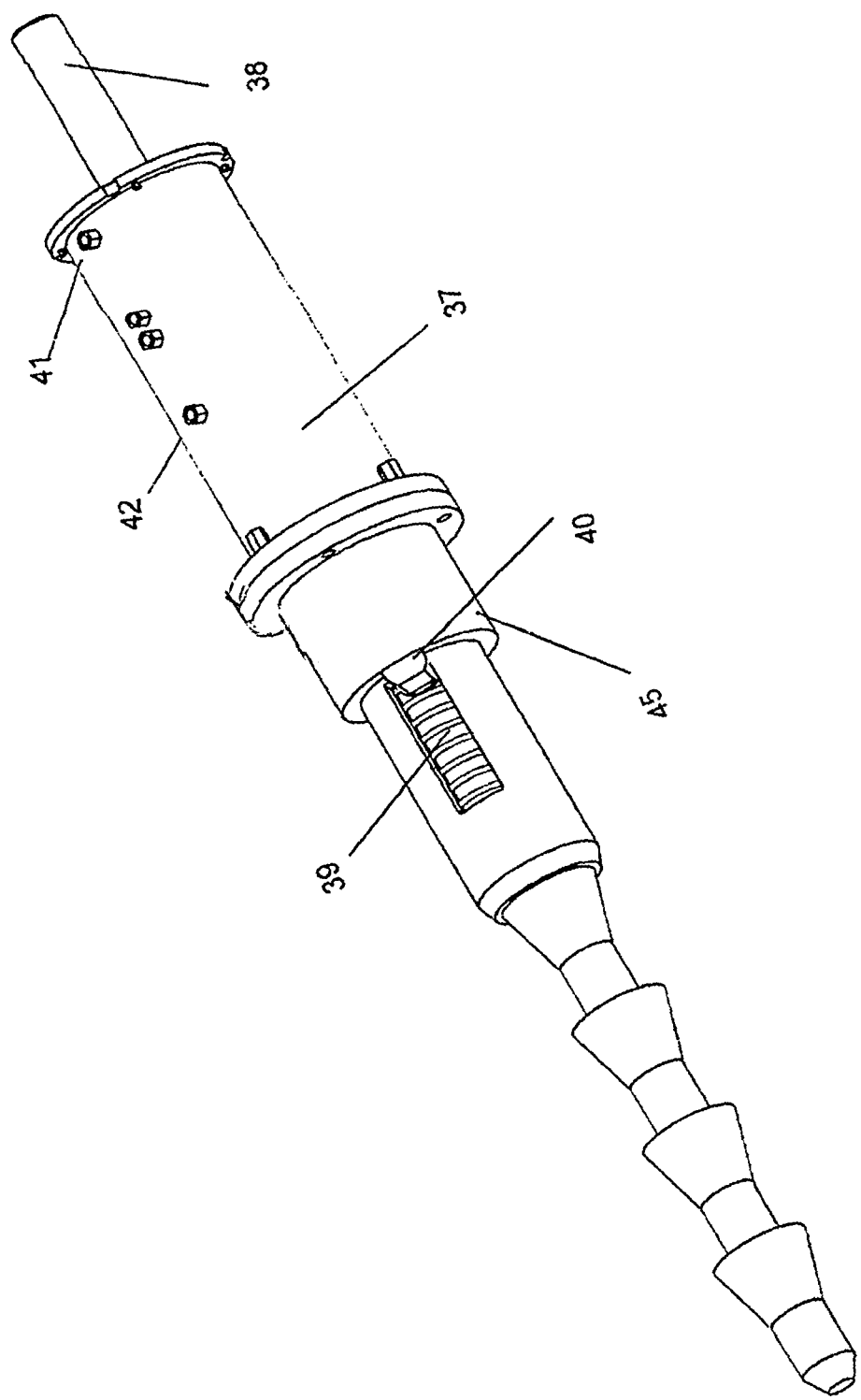
FIG. 4C presents a view of seabed anchoring hammering units at upper position.
Figure 4D:
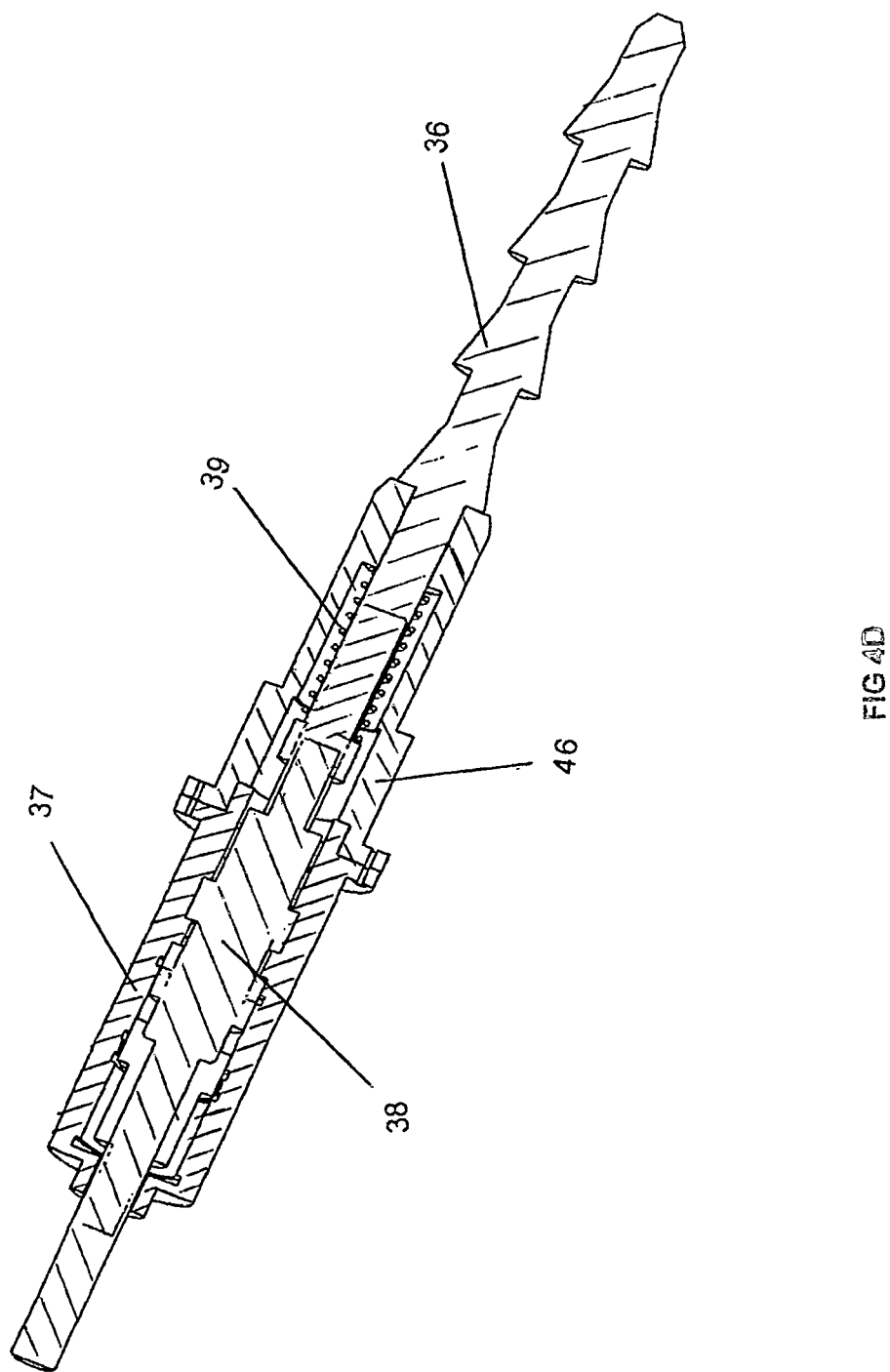
FIG. 4D presents a cross sectional view of seabed anchoring hammering unit.
Figure 4G:
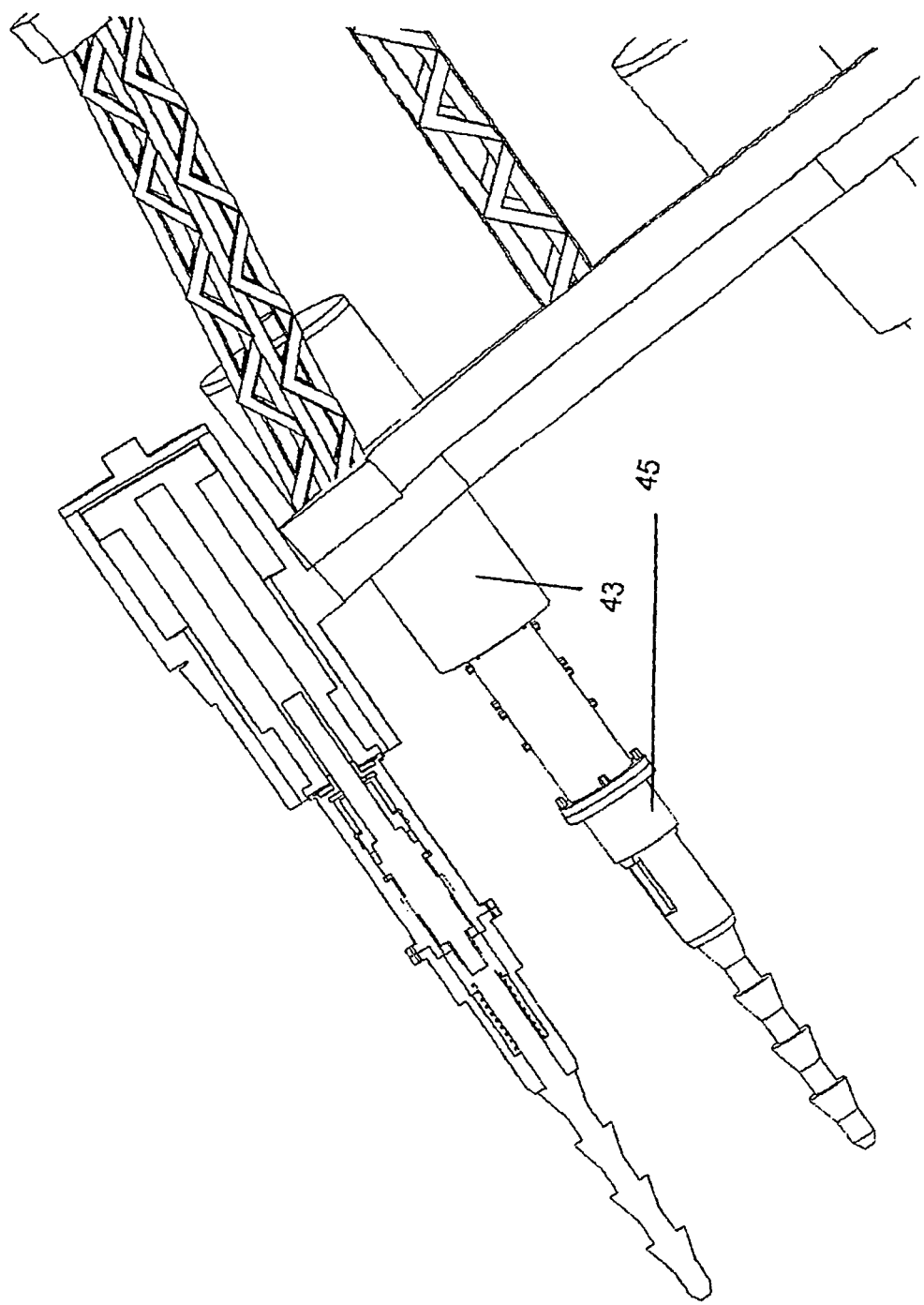
FIG. 4G presents a cross sectional view of top anchoring and hammering cylinders.
Figure 5B:
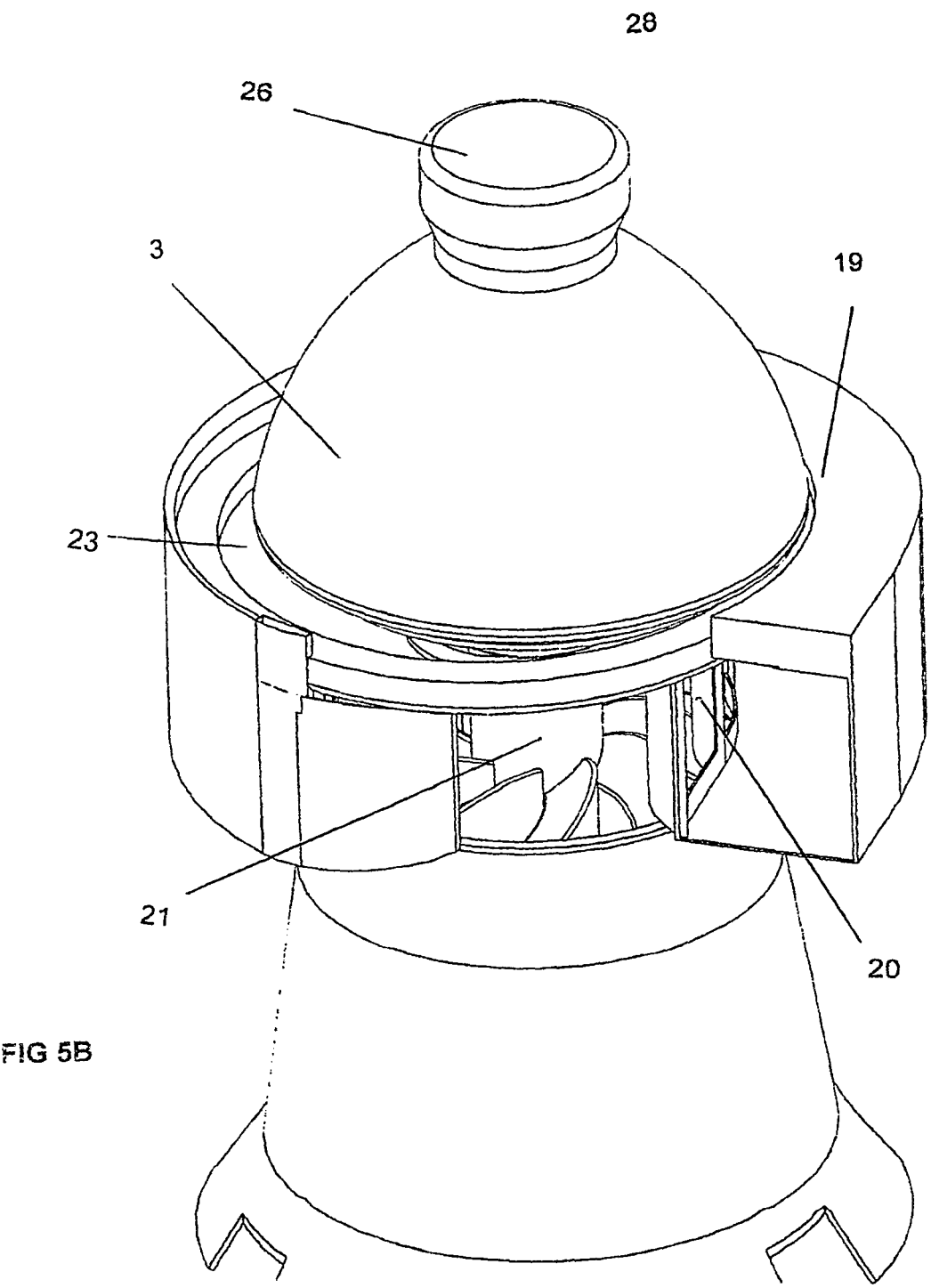
FIG. 5B presents a side view of hydro-turbine
Figure 5C:
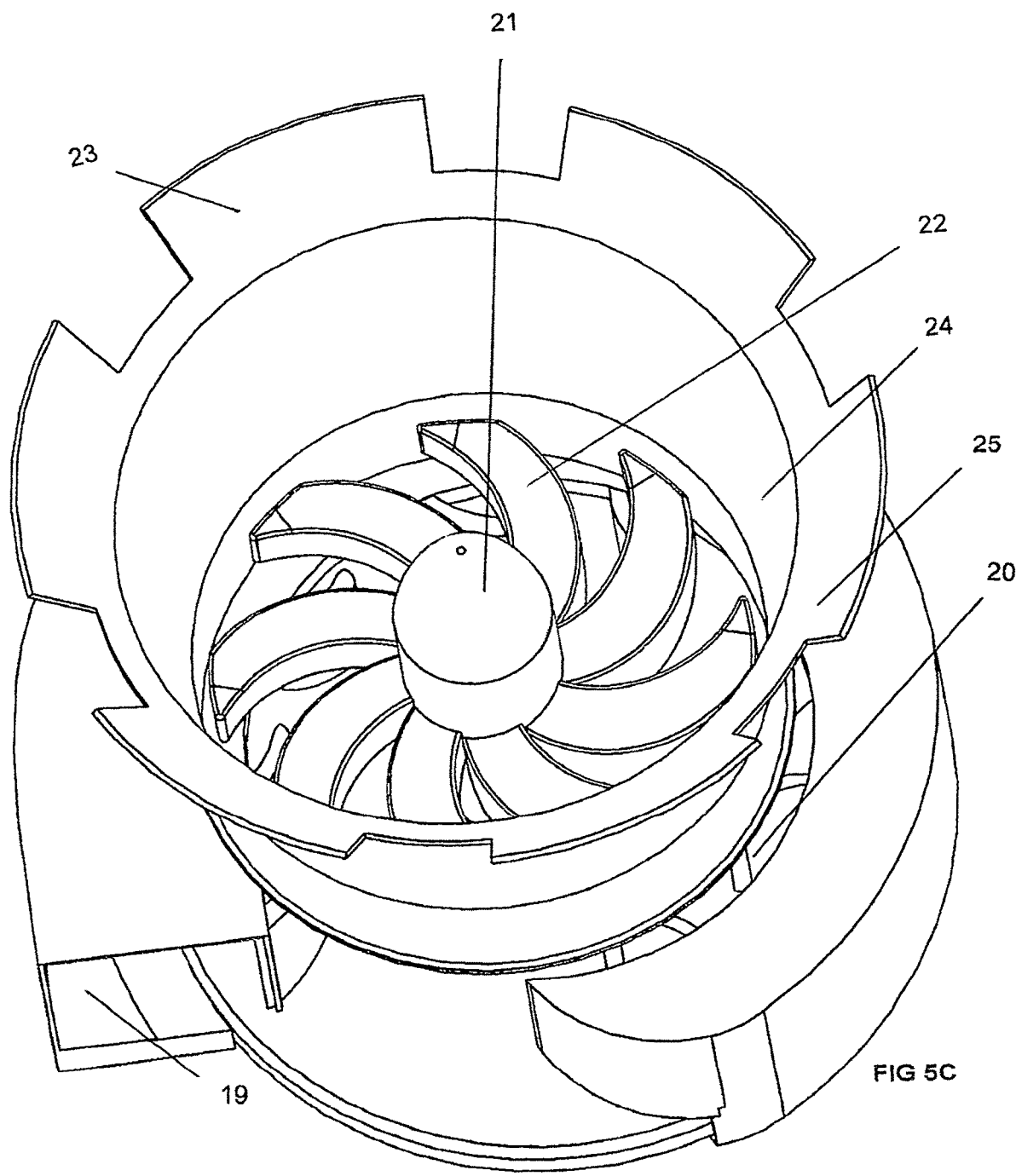
FIG. 5C presents a bottom view of hydro-turbine
Figure 5D:
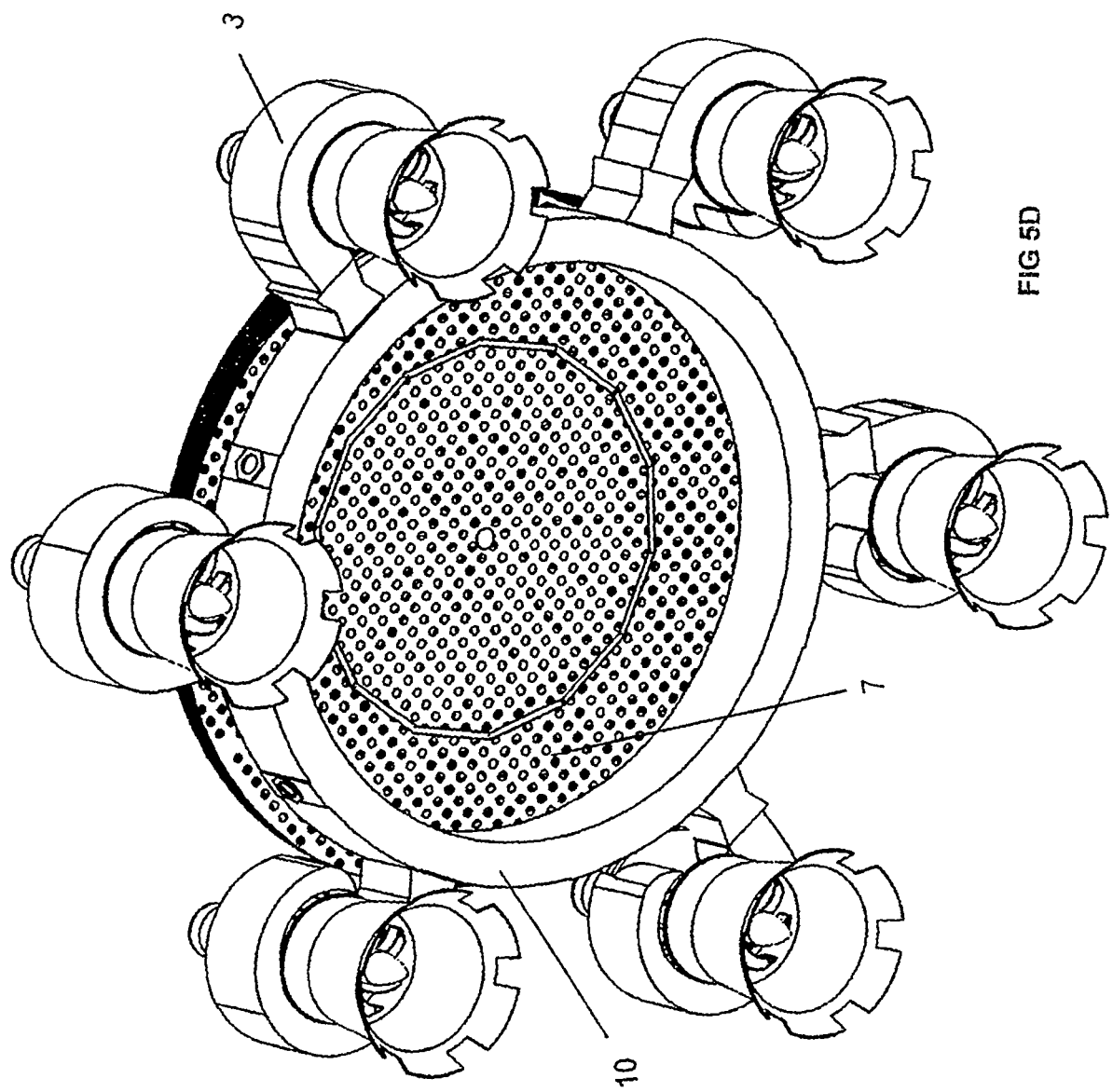
FIG. 5D presents a bottom view of 6 hydro-turbines and trap floor
Figure 5E:
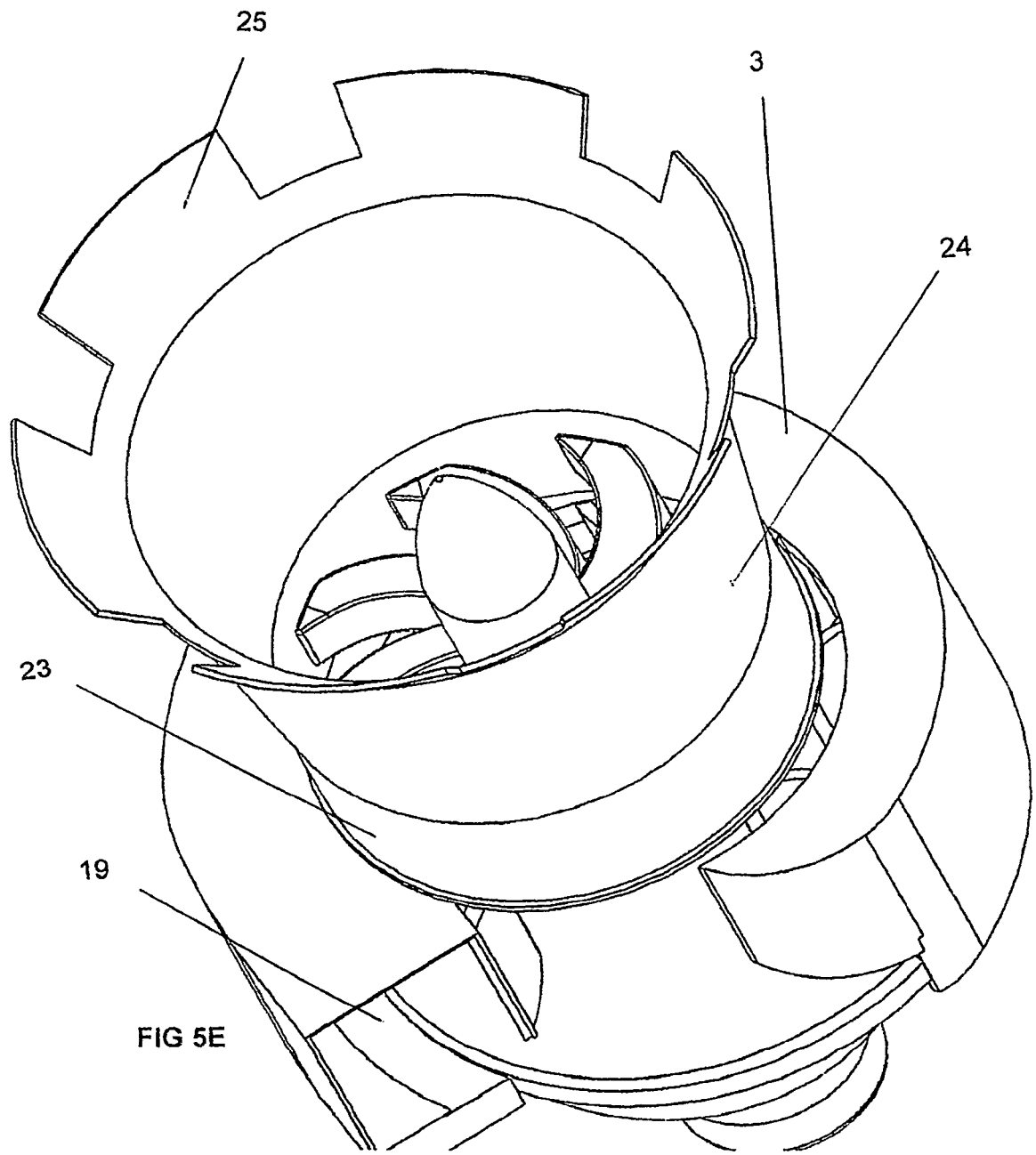
FIG. 5E presents a bottom view of hydro-turbine
Figure 5F:
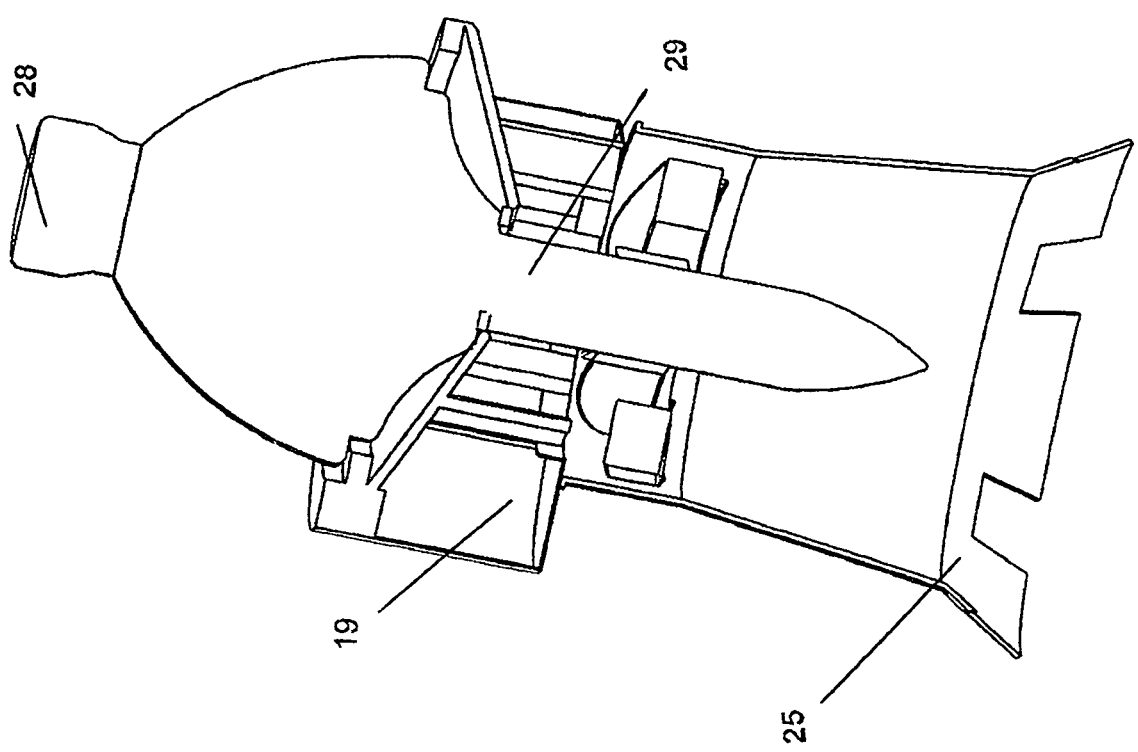
FIG. 5F presents a cross sectional view of hydro-turbine
Figure 6G:
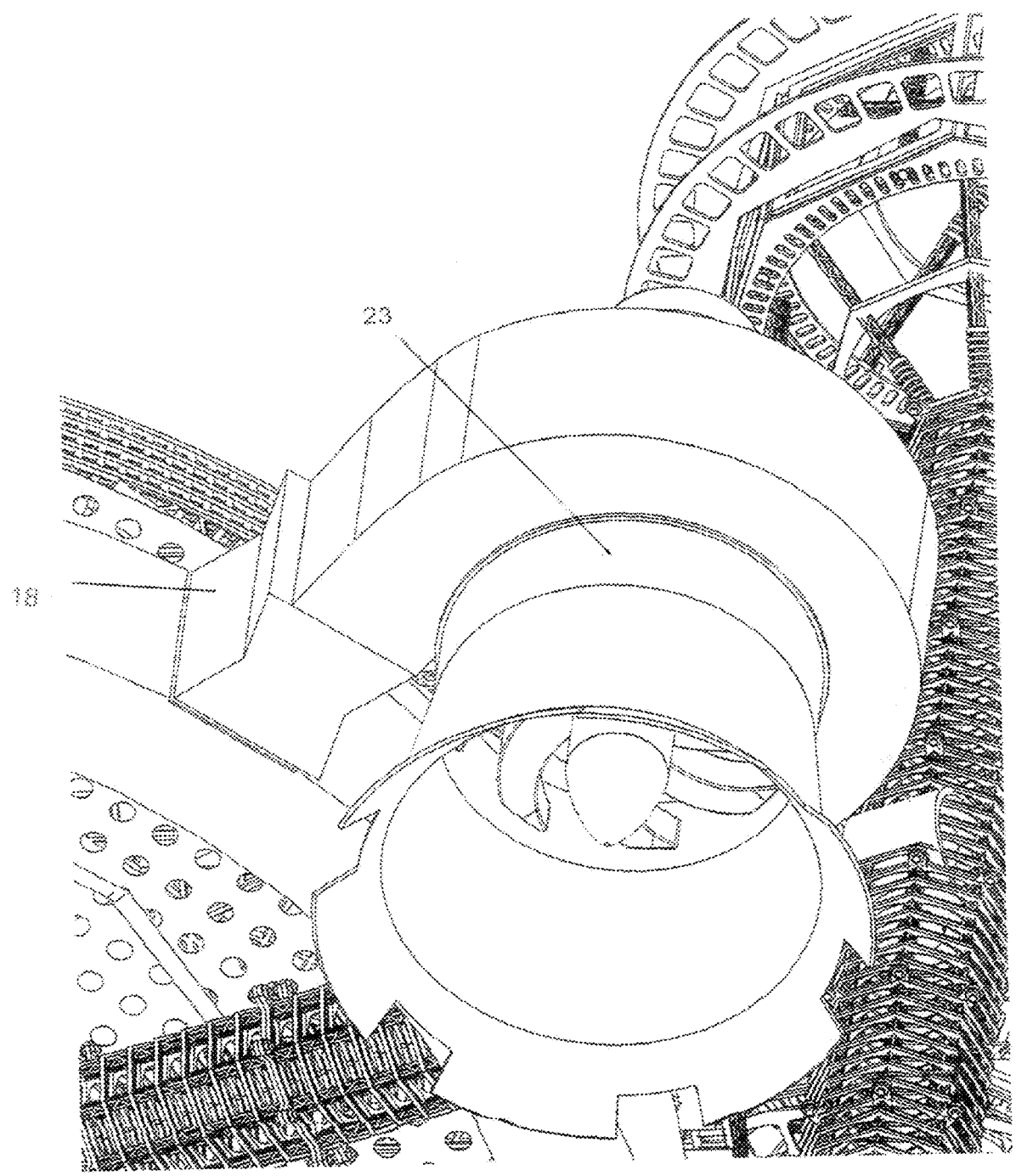
Figure 5J:
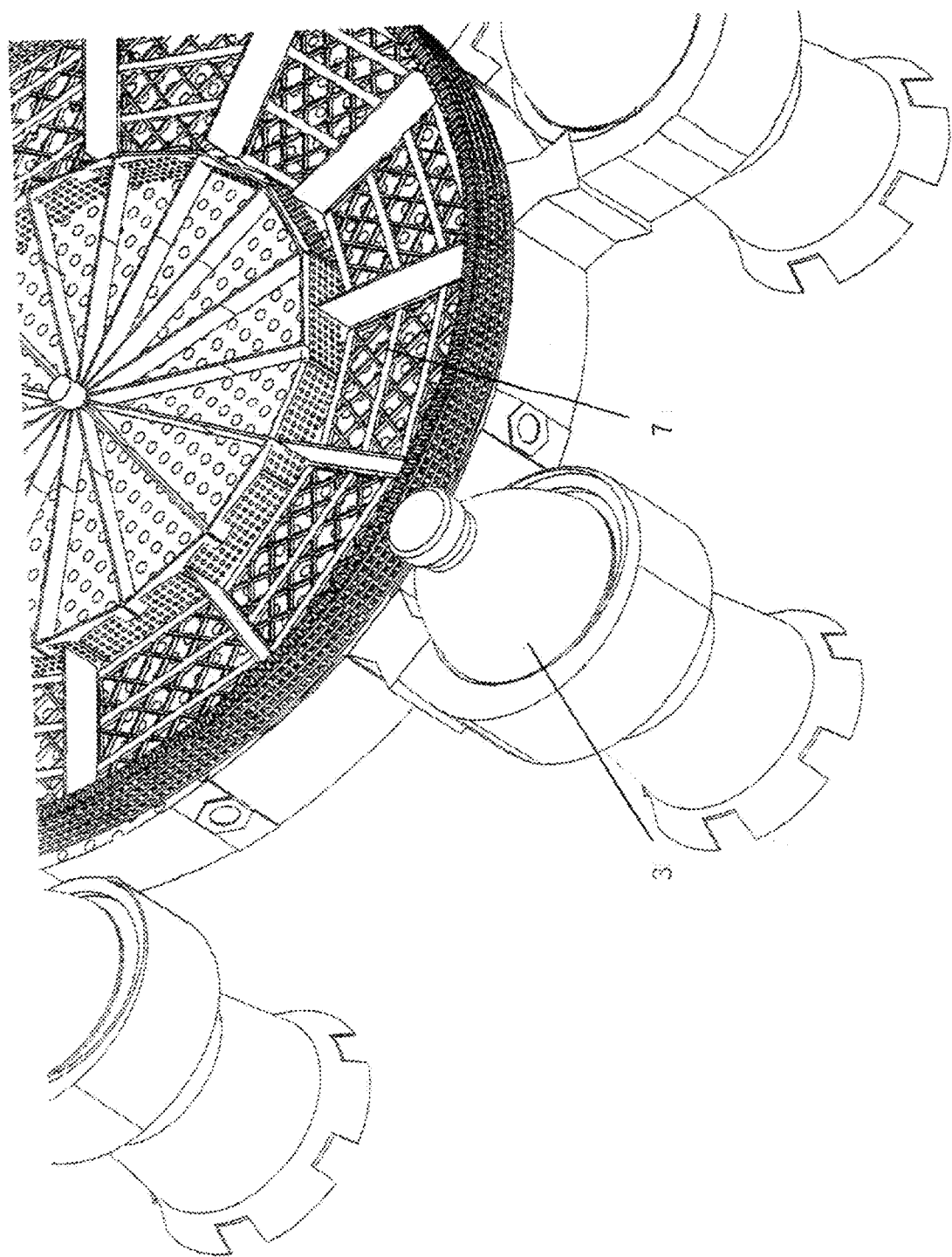
FIG. 5 presents the bottom partial view of the hydro-turbine unit.
FIG. 5A presents a cross sectional view in the hydro-turbine manifold and inlet flow adapter.
FIG. 5G presents a bottom view of hydro-turbine and trap pool support
FIG. 5K presents a top view of hydro-turbine manifolds and trap pool
Figure 5K:
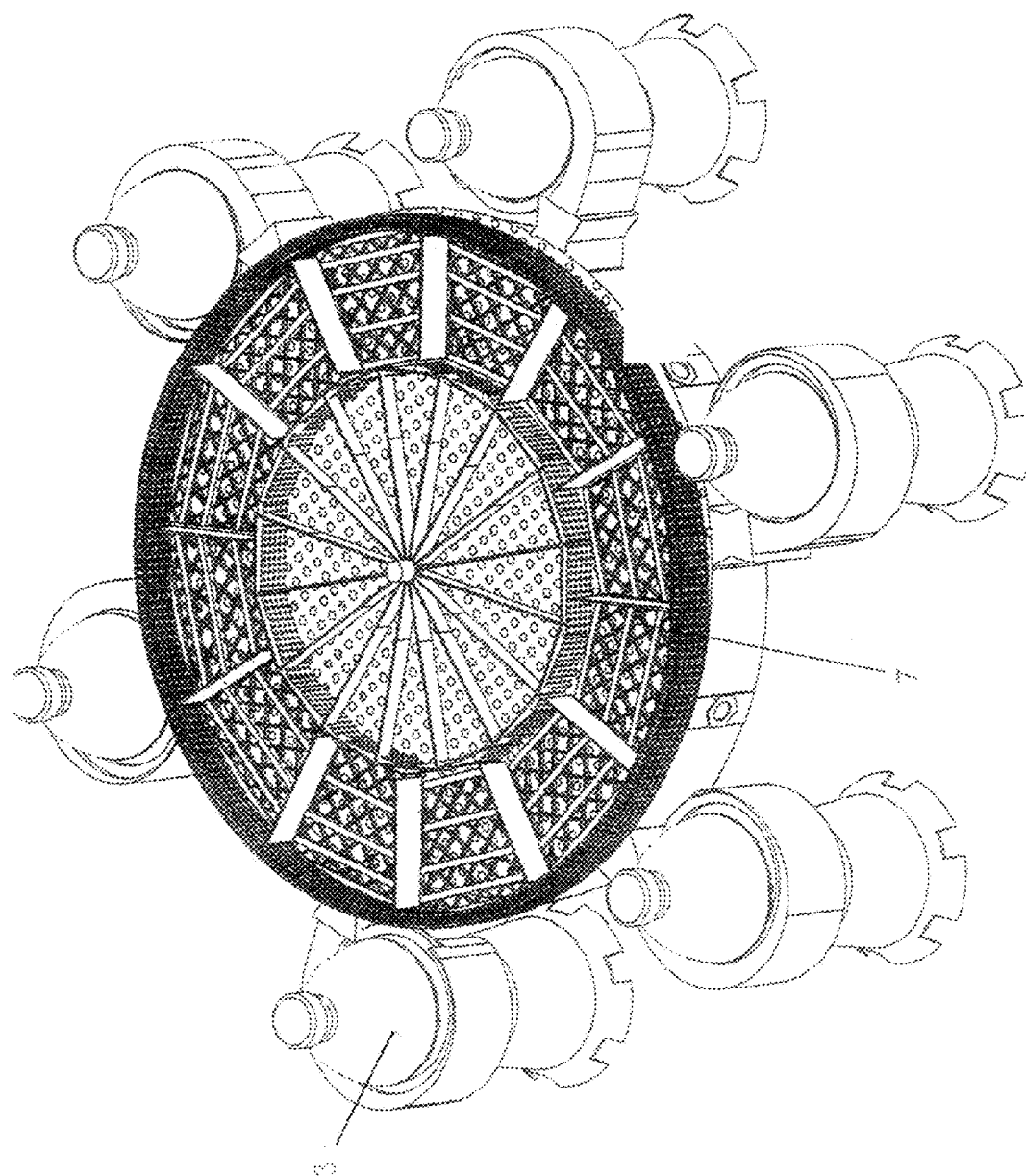

FIG. 4 presents a detailed view of tower bottom with tower's seabed anchoring unit 4 with 8 plunger seabed anchors 36 hammered repeatedly into the seabed dirt by pneumatic power system into seabed with slanted angle of 15 degrees relative to seabed plane. 8 Anchor hammer cylinders 37 with external spool valve controlled from tower upper management room 34 using compressed air to keep hammering the plunger 36 into seabed dirt to maximum extent while automatically reversing the air pressure supply to the stepped piston 38 until complete penetration is achieved. The tower anchoring unit are supported by slanted 8 strong structural trusses 35, keeping the tower fixed to seabed at ocean floor depth up to 100 meters. FIG. 4A presents the detailed view of seabed anchoring hammering cylinders. 8 Anchor top cylinders 43 with 8 anchor top piston 44 applying controlled pneumatic force on the 8 anchor hammering unit 45 and keeping them attached to seabed soil during the reciprocating hammering action of the 8 plungers 37, as controlled from tower upper management room 34. FIG. 4B presents a detailed view of the seabed hammering cylinder of the anchoring unit. The hammering action of plunger 36 against seabed soil is achieved by reciprocating movement of the anchor hammer stepped piston 38 within the anchor hammer cylinder 37. FIG. 4C presents a view of seabed anchoring hammering unit at upper position. Anchor hammer return spring 39 and anchor hammer limit pin 40 limit the penetration of the arrow-shaped plunger into the seabed soil while the hammering unit is kept in contact with the seabed soil by the top piston 44. Anchor hammer upper inlet air pressure port 41 and Anchor hammer upper inlet air pressure port 42 provide the reciprocating movement of the stepped piston with a four way spool valve connected externally to the ports. FIG. 4D presents a cross sectional view of seabed anchoring hammering unit. Anchor hammer lower cylinder 46 with longitudinal stop for anchor hammer limit pin 40 limit the reciprocating hammer penetration travel of the arrow-shaped plunger into seabed. FIG. 4E presents a bottom view of the seabed anchoring unit in arrow-shaped plunger 36 fully extended position. FIG. 4F presents a cross-sectional view of the seabed anchoring hammering unit at fully extended arrow-shaped plunger 36 position. FIG. 4G presents a cross sectional view of top anchoring and hammering cylinders at a fully extended arrow-shaped plunger 36 position.

FIG. 5 presents the bottom partial view of the hydro-turbine with turbine assembly 3 and turbine blades 22. FIG. 5A presents a cross sectional view in the hydro-turbine manifold and inlet flow adapter. The hydrostatic pressure of the water trapped in the trap pool 7 is built in the U channel ring 10 creating water flow from the U channel into turbine inlet adapter 18 and to turbine inlet manifold 19. 6 Air compressors 26 coupled to turbine shaft to convert renewable energy of hydrostatic water pressure head in the trap pool into clean compressed air energy stored in tower top compressed-air tanks that is transferable energy to the coast. The compressed air energy harvested from the 6 turbines is also used to operate plankton pumps to bring plankton from ocean floor to sea level fishery pools feeding the fish. In addition, the compressed air energy is used to drive arrow-shaped plungers 36 into seabed to secure the towers to the bottom of the ocean up to 100 meters deep. Furthermore, the compressed air energy is used for creating local electrical energy by air motors output shafts coupled with electric energy generator input shafts. FIG. 5B presents a side view of a hydro-turbine with turbine shaft 21 coupled with air compressor 26 input shaft. Horizontal turbine guide vanes 20 with turbine convergence taper 23 swirl the high rate water flow in the horizontal turbine manifold 19 spiraling the water into a vertical swirl flow through the turbine blades 22 and apply torque on the turbine blades to turn the turbine shaft. FIG. 5C presents a bottom view of hydro-turbine with gradual increase in pipe diameter of the turbine draft pipe 24 and with turbine vertical divergence outlet 25 flow the water downwards at gradually increasing diameter causing lower pressure after passing the turbine blades back to the external ocean water level. FIG. 5D presents a bottom view of 6 hydro-turbines and trap floor with U channel 10 collecting high hydrostatic pressure water of the trap pool 7 and directing water flow through radial openings in the U channel into turbine inlet flow adaptor 18 and into turbine inlet manifold 19. FIG. 5E presents a bottom view of hydro-turbine with gradually reduced external diameter and flow cross-sectional turbine manifold for increasing flowing water dynamic pressure through the turbine radial guiding banes 20 and turbine upper convergence taper 23 swirling the high dynamic pressure water into vertical swirling flow into the turbine blades 22. FIG. 5F presents a cross sectional view of hydro-turbine with air compressor shaft 29 coupled with turbine shaft 25, producing high pressure compressed air at the air compressor outlet 28. FIG. 5G presents a bottom view of hydro-turbine and trap pool support with turbine convergence taper 23 and turbine inlet manifold gradual diameter reduction causing increase in water flow dynamic pressure before swirling down vertically after the 90 degree turn into turbine blades. Turbine divergence taper 25 causes reduction of water flow dynamic pressure when water flows back into external ocean water at zero head energy. FIG. 53 presents a top view of the hydro-turbine and trap pool with the radial 12 and axial truss construction of trap pool 7. FIG. 5K presents a top view of hydro-turbine manifolds and trap pool. The trap pool with a about 100 meter diameter floor and surrounding walls sealed with floor tiles equipped with check valves is strengthened by a structural circular U shape cross sectional circular channel ring 10 along the walls of the pools, and structurally attached to the trap pool floor. The U shape channel ring 10 has 6 radial flow openings on their circumference where they are connected to turbine flow adapters 18 which are bolted to the turbine manifold.

The invention claimed is:

1. An offshore mobile unit having renewable energy hydro-turbines powered with captured ocean combined wave, tidal and stream energy with supporting towers hammered to a seabed with transferable stored air tanks producing local electrical energy, the offshore mobile unit comprising
    a. a water trap pool with check valve floating balls that control flow through inlet holes through surrounding walls and floor thereby allowing ocean water to flow into the water trap pool and cannot flow back into ocean;
    b. multiple hydro-turbines with flow inlet into a circular horizontal manifold connected to said trap pool with flow guides to downward swirling vertical flow, with a vertical outlet diverging pipe and rotating shaft with multiple turbine blades;
    c. multiple tall truss towers extending from above an ocean level to an ocean floor with lateral truss support of said water trap pool, thereby keeping said trap pool walls and floor height fixed to ocean floor and trapping water gaining head above ocean water level; and,
    d. an anchoring system for anchoring the offshore mobile unit to the seabed, the anchoring system comprising: multiple reciprocating hammering actuators, arrow shaped plungers configured to be installed into the seabed at slant angle of 15 degrees to a seabed local plane; a four way pneumatic spool valve is used to control the hammering effect by moving a stepped piston rapidly back and forth from fully down to fully up positions; an additional larger cylinder connected to a tower lower seabed attachment system of eight arrow shaped plungers slanted at 15 degrees to the seabed local plane that pushes the arrow shaped plungers against the seabed continuously during the hammering action to achieve deeper penetration of the arrow shaped plungers for anchoring the multiple tall truss towers; wherein the arrow shaped plungers comprise a return helical spring and locking pin to limit the travel of the arrow shaped plungers.

* * * * *